US008949945B2

(12) United States Patent
Larsen

(10) Patent No.: US 8,949,945 B2
(45) Date of Patent: Feb. 3, 2015

(54) DISTRIBUTED NETWORK MANAGEMENT HIERARCHY IN A MULTI-STATION COMMUNICATION NETWORK

(71) Applicant: MOSAID Technologies Incorporated, Ottawa (CA)

(72) Inventor: James David Larsen, Woodinville, WA (US)

(73) Assignee: Conversant Intellectual Property Management Inc., Plano, TX (US)

( * ) Notice: Subject to any disclaimer, the term of this patent is extended or adjusted under 35 U.S.C. 154(b) by 0 days.

(21) Appl. No.: 13/724,022

(22) Filed: Dec. 21, 2012

(65) Prior Publication Data

US 2013/0117828 A1    May 9, 2013

Related U.S. Application Data

(63) Continuation of application No. 12/518,961, filed as application No. PCT/IB2007/055120 on Dec. 14, 2007, now Pat. No. 8,347,361.

(60) Provisional application No. 60/874,900, filed on Dec. 14, 2006.

(51) Int. Cl.
*H04L 29/06* (2006.01)
*H04L 12/24* (2006.01)

(52) U.S. Cl.
CPC ............... *H04L 63/08* (2013.01); *H04L 41/12* (2013.01); *H04L 63/10* (2013.01); *H04L 63/20* (2013.01)
USPC ............................. 726/4; 713/154; 713/168

(58) Field of Classification Search
CPC ......... H04L 63/08; H04L 63/20; H04L 63/10; H04L 41/12; H04L 41/0213; H04L 45/20
See application file for complete search history.

(56) References Cited

U.S. PATENT DOCUMENTS

| 6,097,703 | A  | 8/2000  | Larsen et al. |
| 6,473,617 | B1 | 10/2002 | Larsen et al. |
| 6,785,510 | B2 | 8/2004  | Larsen |
| 6,810,428 | B1 | 10/2004 | Larsen et al. |
| 6,965,568 | B1 | 11/2005 | Larsen |

(Continued)

FOREIGN PATENT DOCUMENTS

| WO | 96/19887 A | 6/1996 |
| WO | 98/35474 A | 8/1998 |

(Continued)

*Primary Examiner* — Izunna Okeke
(74) *Attorney, Agent, or Firm* — Conley Rose, P.C.; J. Robert Brown, Jr.

(57) ABSTRACT

The invention relates to a network and to a method of operating a network. The network comprises a plurality of stations each able to transmit and receive data so that the network can transmit data between stations via at least one selected intermediate station. The network further comprises a plurality of levels of stations including a first level comprising user and/or seed stations, a second level comprising auxiliary stations providing access to auxiliary networks, a third level comprising at least one location management station, and a fourth level comprising at least one authentication station. The method comprises transmitting, from or on behalf of a station on the first level requiring authentication, to an authentication station via one or more stations, an authentication request message. In response, the authentication station transmits authentication data to authenticate the station on the first level.

23 Claims, 12 Drawing Sheets

(56) References Cited

U.S. PATENT DOCUMENTS

| | | |
|---|---|---|
| 7,590,068 B2 | 9/2009 | Larsen et al. |
| 2002/0162028 A1 | 10/2002 | Kennedy |
| 2004/0268131 A1* | 12/2004 | Kudo et al. .................. 713/182 |
| 2005/0063356 A1 | 3/2005 | Larsen et al. |
| 2005/0135242 A1 | 6/2005 | Larsen et al. |
| 2005/0135270 A1 | 6/2005 | Larsen et al. |
| 2006/0236377 A1* | 10/2006 | Metke et al. ...................... 726/4 |
| 2007/0011262 A1 | 1/2007 | Kitani et al. |
| 2007/0237153 A1* | 10/2007 | Slaughter et al. ............. 370/392 |
| 2007/0280262 A1 | 12/2007 | Larsen et al. |
| 2008/0261605 A1 | 10/2008 | Larsen |
| 2008/0280625 A1 | 11/2008 | Larsen |
| 2009/0133105 A1 | 5/2009 | Larsen |

FOREIGN PATENT DOCUMENTS

| | | |
|---|---|---|
| WO | 2006/043161 A | 4/2006 |
| WO | 2006/123218 A | 11/2006 |

\* cited by examiner

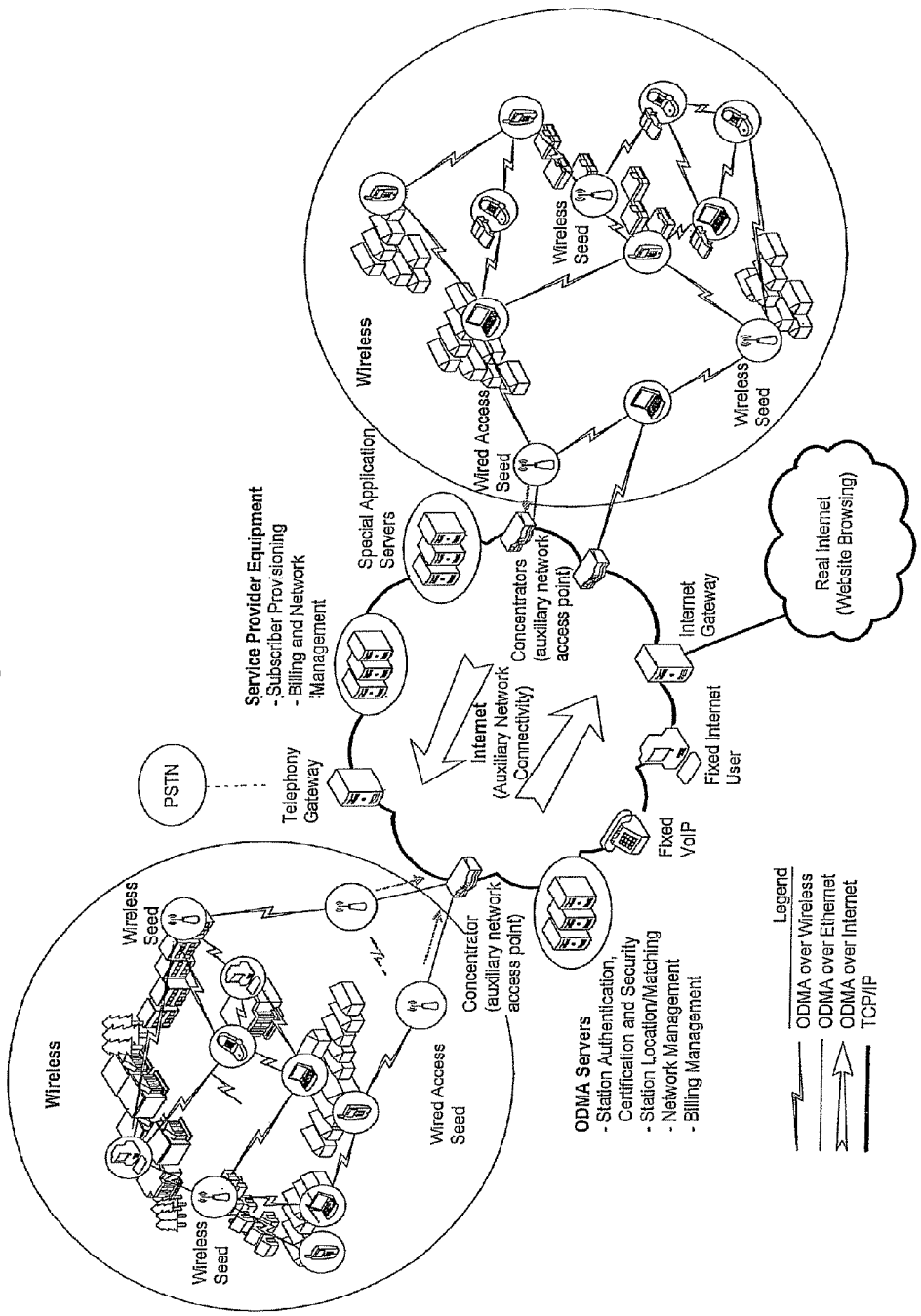

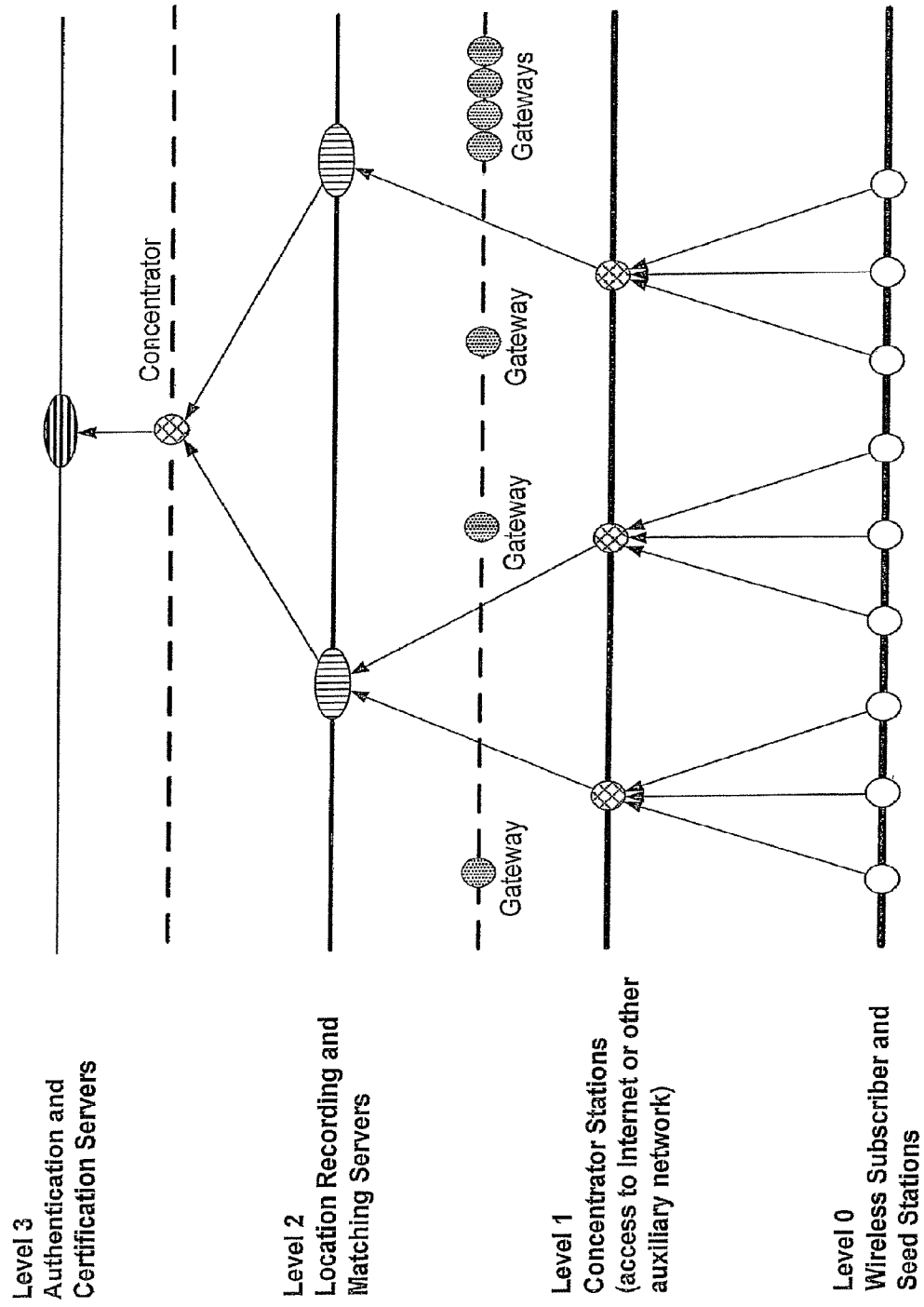

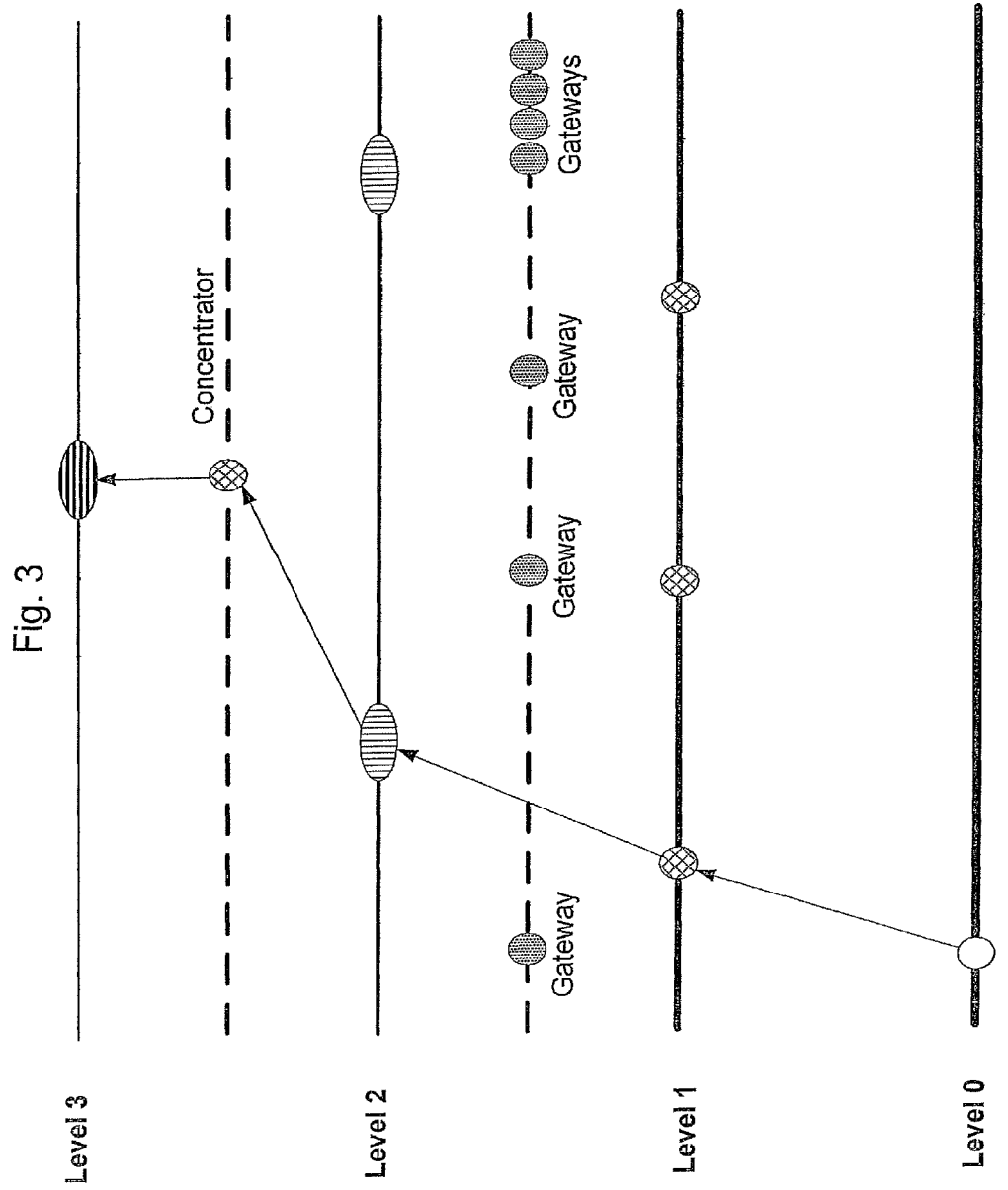

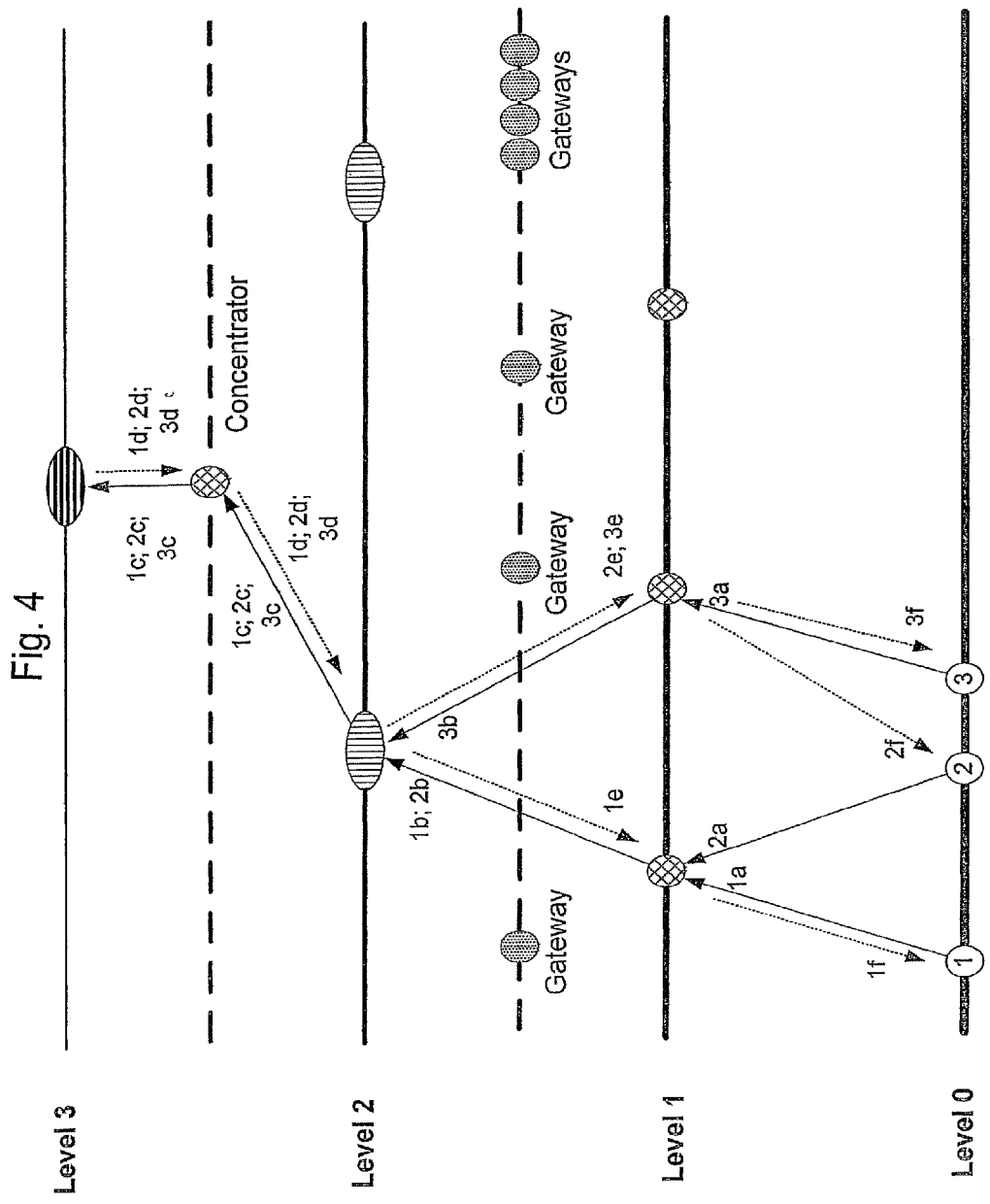

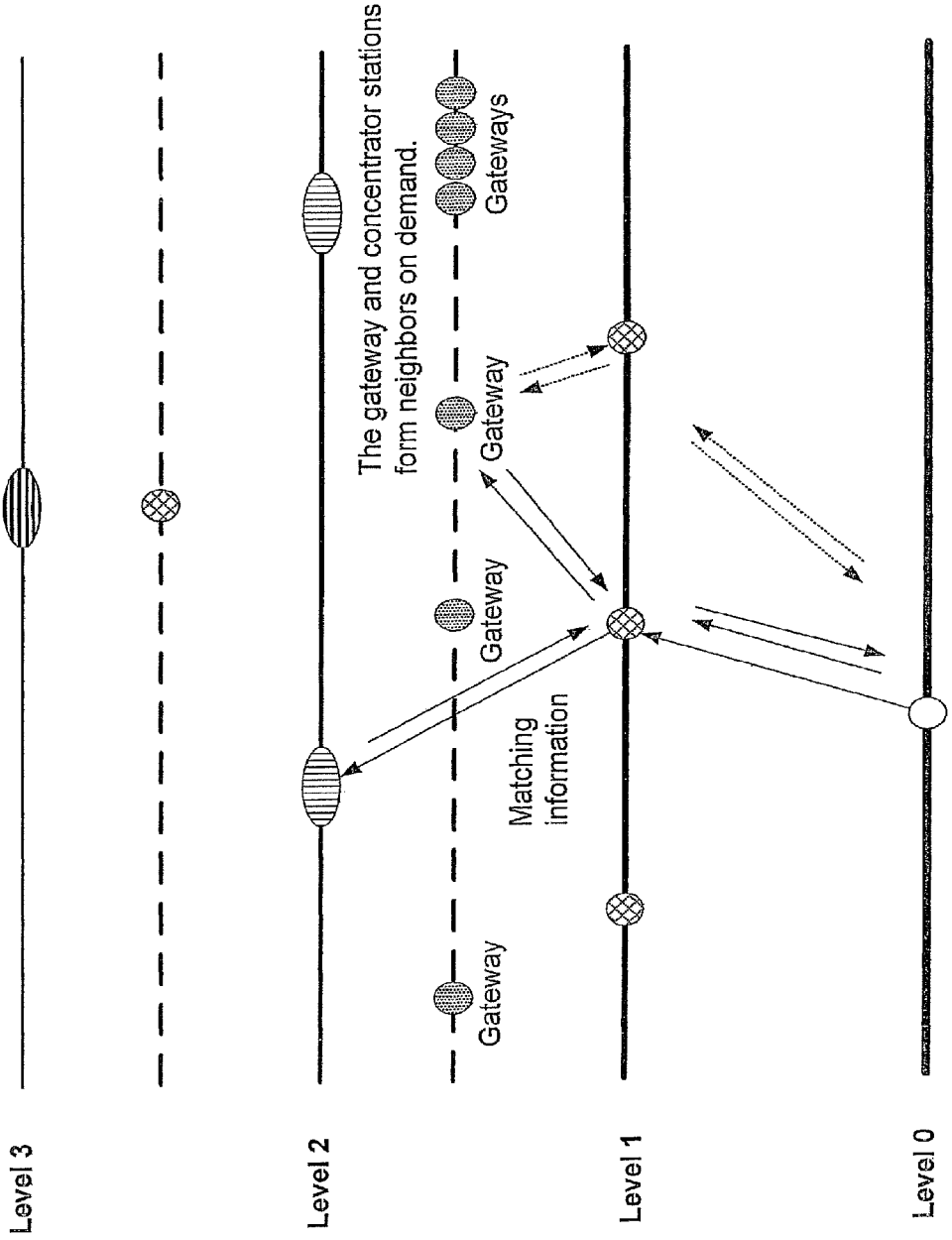

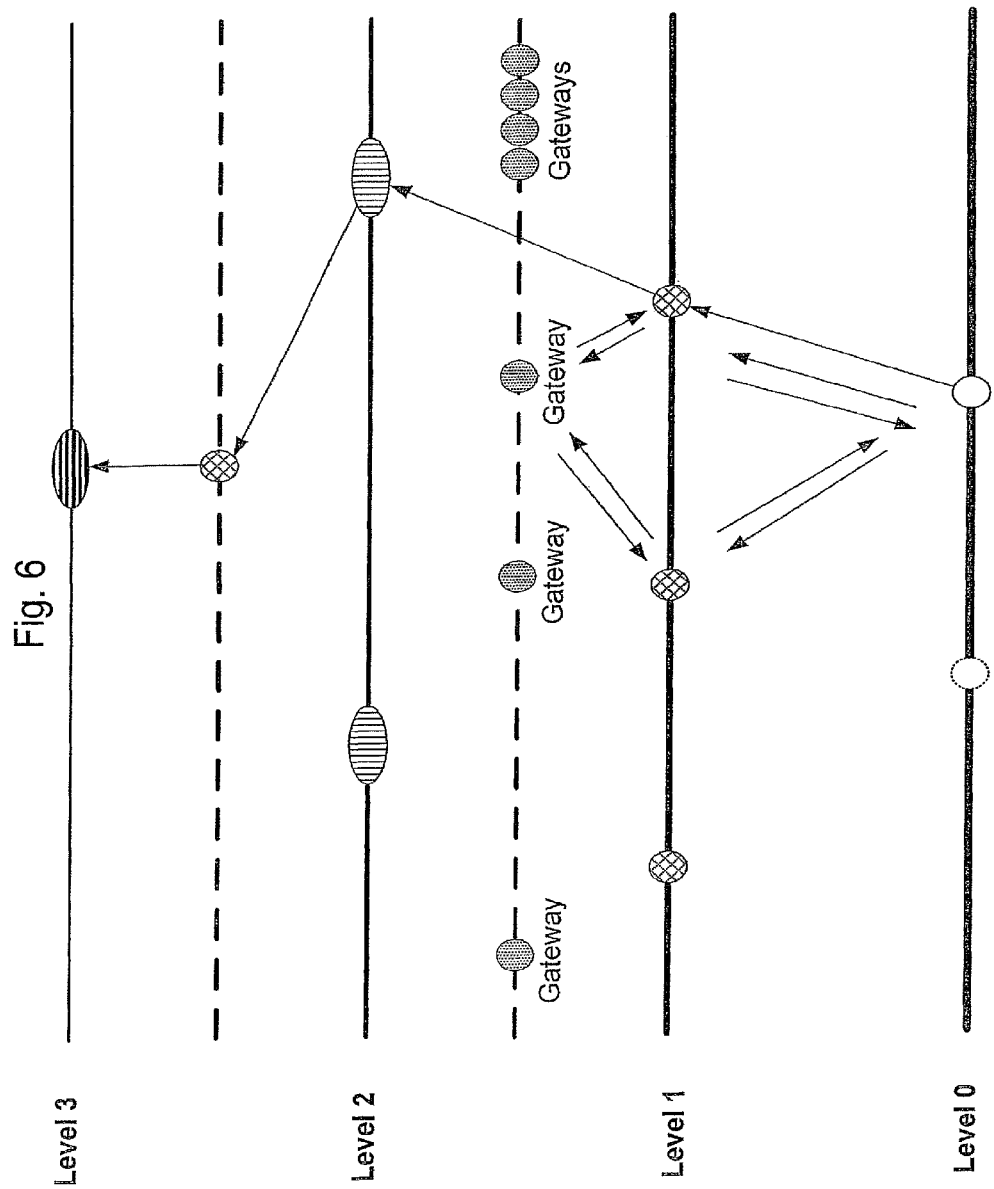

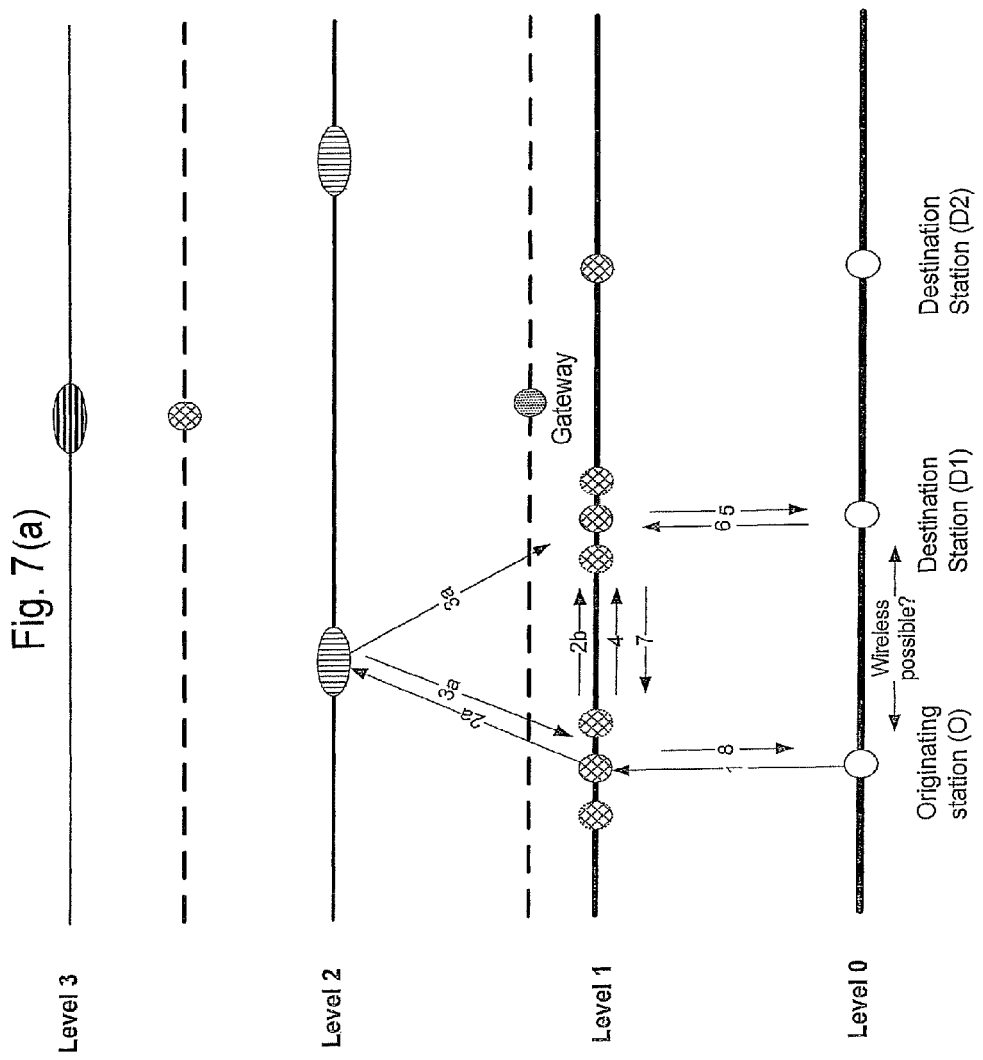

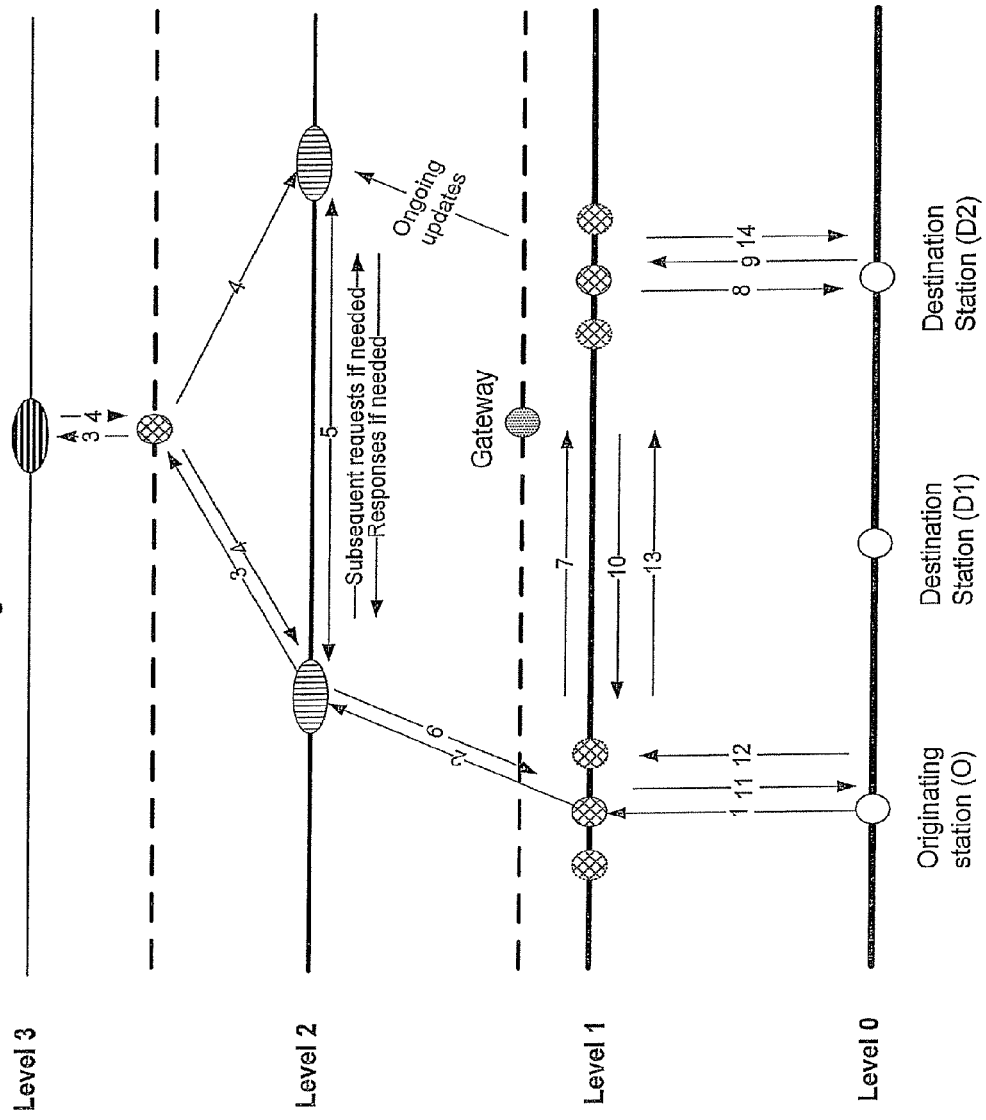

Access Seed (Wireless/Ethernet Station)

Concentrator Stations (Ethernet to Internet Adapters)

DISTRIBUTED NETWORK MANAGEMENT HIERARCHY IN A MULTI-STATION COMMUNICATION NETWORK

CROSS-REFERENCE TO RELATED APPLICATIONS

This application is a continuation of U.S. application Ser. No. 12/518,961, filed Jun. 12, 2009, which is a U.S. National Phase application, corresponding to International Patent Application No. PCT/IB2007/055120, filed Dec. 14, 2007, published on Jun. 19, 2008 in the English language and claiming the benefit of priority of U.S. Provisional Patent Application Ser. No. 60/874,900, filed Dec. 14, 2006.

BACKGROUND OF THE INVENTION

This invention relates to a method of managing a multi-station communication network, of the general kind described in International Patent applications nos. WO 96/19887, WO 98/56140 and PCT/IB2006/001274.

SUMMARY OF THE INVENTION

According to a first aspect of the invention there is provided a method of operating a network comprising a plurality of stations each able to transmit and receive data so that the network can transmit data between stations via at feast one selected intermediate station, wherein the network comprises a plurality of levels of stations including a first level comprising user and/or seed stations, a second level comprising auxiliary stations providing access to auxiliary networks, a third level comprising at least one location management station, and a fourth level comprising at least one authentication station, the method comprising:

transmitting, from or on behalf of a station on the first level requiring authentication, to said at least one authentication station via one or more stations, an authentication request message, said at least one authentication station transmitting authentication data via one or more stations to the station on the first level to authenticate the station on the first level;

maintaining, at said at least one authentication station, a record of each authenticated station on the first level;

monitoring, at said at least one location management station, the location of each authenticated station on the first level with respect to the connectivity of said authenticated stations, whether directly or indirectly, with one or more stations on the second level; and where a station on the first level attempting to communicate with another station on any level is assisted by a station on another level, transmitting connectivity data from said station on another level directly, or indirectly via other stations, to said station on the first level and/or to an intermediate station, the connectivity data identifying other stations with which said station on the first level or the said intermediate station is likely to be able to communicate.

Preferably, assistance is provided to said station on the first level by a station on the second level in preference to a station on the third level, and by a station on the third level in preference to a station on the fourth level.

The connectivity data may be transmitted from said at least one location management station to said station on the first level directly or via at least one intermediate station on a level between said at least one location management station and the station on the first level.

Alternatively, or in addition, the connectivity data may be transmitted from time to time from said at least one location management station to an auxiliary station on the second level, said auxiliary station transmitting the connectivity data to said station on the first level independently of said at least one location management station when required.

Stations on a level other than the first level may maintain a record of connectivity with other stations so that a station on the first level that is attempting to communicate with other stations on any level can communicate with a station on another level to obtain connectivity data when required.

The method may include, when a station on the first level requiring authentication transmits an authentication request message to the authentication station or an authorised location management station via an intermediate station on a level other than the first level, said station on such other level adding data to the authentication request message to verify said station's use in the path followed by the authentication request message.

Said station on such other level may provide a signed certificate which is associated with the authentication request message to prove the utilization of said station on another level to forward the authentication request message.

The network may include a plurality of authentication stations and/car plurality of location management stations, the method including communicating, at at least one location management station, with at least one of the authentication stations so that said at least one location management station has access to the record of authenticated stations on the first level maintained at said at least one authentication station.

In one embodiment of the method, authentication request messages are transmitted, from or on behalf of stations on the second and third levels requiring authentication, to said at least one authentication station via one or more stations, said at least one authentication station transmitting authentication data via one or more stations to the stations on the second and third levels to authenticate the stations.

The method may further comprise the step of transmitting at least one of the authentication request messages to at least one location management station, which transmits the authentication request message to said at least one authentication station on behalf of the station requiring authentication.

Each station may store station specific and/or user specific security data that corresponds to security data maintained at said at least one authentication station, the authentication request messages containing security data of the station requiring authentication which is used as input at said at least one authentication station into a challenge and response algorithm to generate challenge data and expected result data, said at least one authentication station transmitting challenge data to the station requiring authentication, directly or indirectly, the station requiring authentication using the challenge data as input into a challenge and response algorithm to generate response data, the response data being transmitted by the station requiring authentication to the authentication station, directly or indirectly, said at least one authentication station comparing the response data to the expected result data and, if the response data and the expected result data match, said at least one authentication station transmitting authentication data to the station requiring authentication, directly or indirectly.

Preferably, transmissions between the stations after receipt of the authentication request messages are encrypted using challenge data and response data respectively, to provide a secure channel between the stations for the authentication exchanges and for exchange of other data thereafter.

The authentication data may comprise a certificate, an authentication station public key and a station- and/or user-specific private key to the station requiring authentication.

The certificate preferably provides details relating to the respective station including an assigned address, the station's authorized capabilities and degrees of access to network resources.

A station receiving a message as an intermediate or destination station from another station may transmit a certificate request message, directly or indirectly, to the source station requesting that the source station send its certificate to the said receiving station to enable the said receiving station to verify the authentication status and/or the authorization and access permitted.

The method may include transmitting neighbor gathering probe signals from one or more stations, other neighboring stations which receive the neighbor gathering probe signals from a probing station responding directly, or indirectly via other stations, to thereby indicate to the probing station their availability as destination or intermediate stations.

Certificates may be included in at least some probe signals transmitted by a station to indicate, to stations receiving the probe signals, the probing stations capabilities and access to network resources.

The method may include providing one or more additional network management stations which are operable to receive and/or monitor network activity data from one or more other stations on the network, the network activity data including throughputs utilized, initiation and termination of services, applications utilized, utilization of gateway, quality of service information, performance information and/or connectivity information.

Preferably, the network management stations include a network monitoring station and/or a billing station. The method may further provide that the location management stations, the authentication stations and the network management stations are each operable to manage the network collaboratively.

Further according to the invention there is provided a network comprising a plurality of stations each able to transmit and receive data so that the network can transmit data between stations via at least one selected intermediate station, the network including:

a plurality of levels of stations including a first level comprising user and/or seed stations, a second level comprising auxiliary stations providing access to auxiliary networks, a third level comprising at least one location management station, and a fourth level comprising at least one authentication station;

each station being operable to:

transmit, from or on behalf of a station on the first level requiring authentication, to said at least one authentication station via one or more stations, an authentication request message, said at least one authentication station transmitting authentication data via one or more stations to the station on the first level to authenticate the station on the first level;

maintain, at said at least one authentication station, a record of each authenticated station on the first level;

monitor, at said at least one location management station, the location of each authenticated station on the first level with respect to the connectivity of said authenticated stations, whether directly or indirectly, with one or more stations on the second level; and where a station on the first level attempting to communicate with another station on any level is assisted by a station on another level, transmit connectivity data from said station on another level directly, or indirectly via other stations, to said station on the first level and/or to an intermediate station, the connectivity data identifying other stations with which said station on the first level or the said intermediate station is likely to be able to communicate.

BRIEF DESCRIPTION OF THE DRAWINGS

FIGS. 1(a) and 1(b) are schematic connectivity diagrams of a wide area network showing the integration of mobile and wired networks and the use of different types of network stations;

FIG. 2 is a schematic diagram of a distributed network management hierarchy of the present invention;

FIG. 3 is the hierarchy of FIG. 2, showing initial location registration and authentication;

FIG. 4 is the hierarchy of FIG. 2, showing initial location registration and authentication of three wireless stations;

FIG. 6 is the hierarchy of FIG. 2, showing the creation of neighbors on demand;

FIG. 6 is the hierarchy of FIG. 2, showing movement connectivity of one Station Location Registration and Matching Server to another;

FIG. 7 (a) is the hierarchy of FIG. 2, showing levels accessed in transmissions to destination stations;

FIG. 7 (b) shows an alternative transmission to that of FIG. 7 (a);

DESCRIPTION OF EMBODIMENTS

The present invention relates, broadly, to a method of managing a multi-station communication network of the kind described in International patent applications nos. WO 96/19887 and WO 98/156140, the contents of which are incorporated herein by reference.

Networks of this kind use opportunistic relaying techniques to transmit message data from source to destination stations, utilising intermediate stations as relays when required, and are referred to herein as ODMA networks, for Opportunity Driven Multiple Access. The ODMA methodology can be applied to both wireless (typically radio) and wired communication media. The basic operation of such a network is described in Appendix A.

Authentication and Security

Figure 1B:
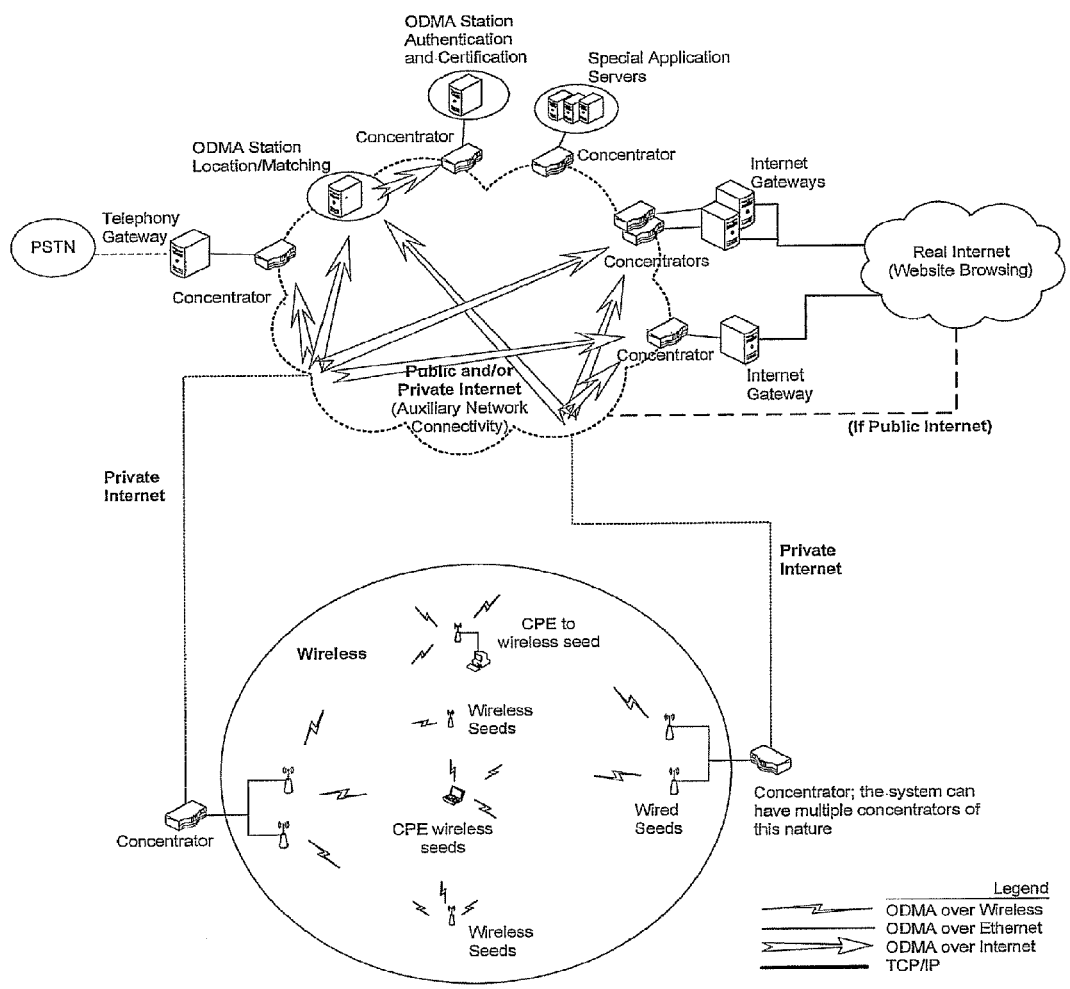

FIG. 1(a) shows the component stations of a typical ODMA network with access to global functionality. FIG. 1(b) is an alternative depiction of a network such as that shown in FIG. 1(a) in which the role of the concentrator stations is indicated. All the ODMA stations on the network typically have a smartcard, including all the wired and/or wireless subscriber station devices, the infrastructural stations, the network management and monitoring stations and the service provisioning and application providing stations.

The infrastructural stations may include one or more of the following:

wireless seed stations (stations available to serve as relaying stations in the absence of or in addition to subscriber stations);

concentrator stations (which are typically connected over Ethernet on one side to the wireless network through wired seed stations, and by ODMA over Internet on the other side to the auxiliary network; the wired seed stations have both wired (for example ODMA over Ethernet) connectivity to other wired seeds and to the concentrator, and wireless connectivity to wireless seeds and user stations);

access point stations providing connectivity to an auxiliary network (such as the Internet or satellite networks as appropriate on a private/public IP network);

gateway stations to PSTN (public switched telephone network) and to the Real Internet (web browsing); and centralized/distributed network security and network management server stations.

The network security and management server stations include station authentication and security servers (Authentication and Certification Servers); station location, registration and matching servers (LRMS); network management servers (such as network testing, equipment and station monitoring and Quality of Service (QOS) systems); and billing servers. Service provider stations include provisioning stations, as well as stations providing any billing and network management functionality that may be required from the service provider side, including network and station monitoring and planning equipment.

The smartcards enable stations to confirm the legitimacy of other stations in the network. It should be evident that even the Authentication and Certification Server and the other network management servers have smartcards associated with their functionality, to enable all other network stations to ensure their communications are being undertaken with legitimate devices. For secure and efficient network operation, any illicit attempts to intercept messages or to overload the systems deliberately with "bogus" transmissions, which are designed merely to crash or slow the network, should be avoided. Consequently, the network management processes should be able to prevent unauthorized stations from participating in the network; and stations with duplicate identifiers, or stations mimicking genuine station transmissions, should be identified and prohibited from causing routing problems and potentially allowing interception of data.

Security functionality in the ODMA network is undertaken using "digital signature" technologies (also called "public key" encryption), which use algorithms based on different but mathematically related keys. In such systems, the first key (the private key) is known only to the signer, who creates the signature or encrypts the message, while the second key (the public key) is known more widely and used to verify the signature or to return (decipher) the data to its original format.

If a message is encoded with a private key, not only will the related public key afford access to the message, but the user of the public key will be able to ensure that the station which encoded the message is legitimate; as only the station holding the private key can have created such a message. It is also possible to encrypt a message with a public key provided by a station, in which event only the station with the corresponding private key will be in a position to decipher the message. In other words, not even the encoder of the message can reopen the encoded message in these circumstances and this provides very secure transmissions.

In conventional systems, a transmission might be sent all the way to a central authority before it is recognized as being illegitimate—which would unnecessarily utilize network resources. In the ODMA network, stations simply will not assist a new station that has not been authenticated, so the network resources are not used at all. However, this creates a complication when a new station is switched on for the very first time, as it will not have an authenticated certificate or the current public key from the Authentication and Certification Server. While it needs to communicate with the Authentication and Certification Server in order to get this information, if it is not in the vicinity of the Authentication and Certification Server, it will not be able to send any message as all other stations will ignore the new user station (as they have no means of verifying it by looking at its certificate).

A method is consequently available to allow the other user stations to help the new one get its keys and certificate, without affecting their routing tables or jeopardizing the security of the network. The new station will generate a special message for the Authentication and Certification Server, which is reserved for the sole purpose of authentication. Any other station seeing and relaying this message will create a new identity in its routing tables, with an added flag indicating that it should not send any data other than a response message from the Authentication and Certification Server. Other stations will also only allow these key messages to pass if they are of the correct size, and have the correct time-to-die associated with them. This will prevent an unauthorized user station from attempting to incapacitate the network by flooding it with many key request messages. Station authentication methodologies are described in International patent application WO 98/35474, the contents of which are incorporated herein by reference.

When a station is switched on for the first time it is checked against the local "lock" setting and if it is not valid no further operation will be possible. If it is deemed valid, it must first read the inserted smartcard to get its identity details. It will then establish whether it has a valid Authentication and Certification Server public key, and whether the identity of the smartcard that is stored in the units flash drive is different from the one the station last used. If necessary, it will be allowed the limited contact with the Authentication and Certification Server to provide the station with the Authentication and Certification Server's public key, together with a certificate and the public and private keys for use by the station itself.

The Authentication and Certification Server has access to information relating to all the stations operating in the network as well all the identity numbers associated with the smartcards inserted in every station. This allows the Authentication and Certification Server to send a private key over a secure channel that is unique to the user station, back to the user station without any other station being able to retrieve the key. However, in order to do this, the Authentication and Certification Server will first need to verify the legitimacy of the smartcard. Moreover, the station will need to verify that the Authentication and Certification Server is genuine, to prevent any unauthorized Authentication and Certification Server station being set up with the purpose of infiltrating the network and intercepting messages.

This mutual verification is undertaken through a challenge and response process, typically using a 3G authentication algorithm, such as the Milenage algorithm, which also sets up temporary symmetric keys to support the secure channel. Based on this interrogation procedure, it will provide the keys if appropriate. The interrogation procedure is typically as follows:

Each smartcard (typically a USIM card) issued for use in the ODMA network has a secret key (K) stored in it, and the same key is also stored in the records of the Authentication and Certification Server in respect of the particular smartcard. Furthermore, the USIM card and the Authentication and Certification Server also keep track of a sequence number, which is used to prevent replay attacks ($SQN_{ms}$ and $SQN_{he}$ respectively). The sequence number SQNhe is an individual counter for each user, which is retained at the Authentication and Certification Server; while the SQNms denotes the highest Sequence number the USIM has accepted, and this is stored on the smartcard.

Upon receipt of an access request from a user station, the Authentication and Certification Server uses the key (K) and its sequence number (SQNhe) as inputs to the Milenage algorithm to generate a random number (RAND) and uses the key (K) to generate an expected result (XRES), a cipher key (CK), an integrity key (IK) and an authentication token (AUTN). The random number (RAND) and the authentication token (AUTN) are then sent to the user station.

In response, the user station forwards the challenge to the smartcard, which uses the unique smartcard secret key (K) and the sequence number (SQNms) stored on the smartcard, together with the random number (RAND) and authentication token (AUTN) data provided by the Authentication and Certification Server as input to the Milenage algorithm. From this, the smartcard checks that the supplied sequence number contained within the authentication token (AUTN) is acceptable, and also that the Message Authentication Code (MAC) comes from the Authentication and Certification Server. With a valid MAC and sequence number, the card will generate a result (RES), a cipher key (CK) used to provide and protect a secure channel between the Authentication and Certification Server plus an integrity key (IK). This information is returned initially to the user station device as a response message from the card. The user station should forward the response to the Server, but should also keep copies of the cipher key (CK) and integrity key (IK).

Upon receipt of the response from the station, the Authentication and Certification Server will then be able to confirm that the user station is valid, by checking the result returned by the user (RES) against the expected result (XRES). The user station can also send any additional information it wishes to the Authentication and Certification Server, encoded using the special private cipher key (CK) and the integrity key (IK) to encrypt the message.

If the smartcard (and by association the user station) is found to be valid, the Authentication and Certification Server will be able to access the additional information and can transmit the Authentication and Certification Server public key, the user station's new certificated private key, and a certificate that includes the user station's public key. The messages will be encoded using the special secret cipher key (CK) and the integrity key (IK) that are known only to the user and Authentication Station. Only the user station can open this message and read the contents, and the user station can verify that it comes from the Authentication and Certification Server and that it has not been tampered with in any way.

Any stations relaying the message will not be able to read the messages or payloads as they will not have the specific cipher key (CK). Note that as cipher key (CK) is stored in a station that is not strongly tamper-resistant it will need to be periodically regenerated by repeating the smartcard and Server authentication process, as described above.

The symmetric secure channel created by the card authentication and creation of the cipher key (CK) and integrity key (IK) may be used generally, although a major usage is for the exchange of public/private key information between the Server and user stations. Such information would include the server public key, the user station private key and the user station certified public key.

It should be evident that there are several confirmatory checks in piece in this process that enable both the network stations and the Authentication and Certification Server to confirm each others' legitimacy and periodically reestablish secure channels for confident distribution of the operational keys (private keys, public keys, certificates) and other sensitive payloads. This process is repeated using random numbers and a new special private key created every time the new certificate is sent to user stations. Any other station on the network that is provided with the certificate will be able to open it with the Authentication and Certification Server public key and confirm that it has been authenticated by the Authentication and Certification Server (so it has confidence that it is legitimate) and be able to use the user station's public key.

The Authentication and Certification Servers public key will change on a regular basis, so every station is typically required to interact with it regularly (for example, this may be hourly, daily, weekly, etc, depending on the device) to make sure that it has received the latest Authentication and Certification Server's public key, which will specify a renewal time, an expiry time and a delete time. Usually the user station devices are programmed to cause the certificate to expire automatically when the smartcard is removed. When the renewal time is reached, or the certificate expires for other reasons, the user station must get the next Authentication and Certification Server's public key and a new certificate.

The Authentication and Certification Server will also have the unit's identity (the Media Access Control address of the unit is exchanged in the authentication), so it will be able to determine if the smartcard is stolen (or has been moved to a new piece of hardware), if it is being utilized in duplicate and if the unit is itself legitimate (whether in terms of unlicensed manufacture or theft). To prevent a station from communicating without a valid smartcard, the unit will intermittently check the status of the smartcard (a card presence and validity check) to make sure it has not been removed or expired.

The "certificate" provided to the station details the identity of the ODMA station (under en assigned ODMA address), together with information regarding the station's authorized capabilities on the network (like a passport through the network, indicating that the station has credits, or that the station can utilize certain gateways or other resources, or specify degrees of access etc). Each station then provides its certificate (encoded with its private key) in certain slow probes, so that its neighbor stations receiving the probes will be able to know what they are permitted to do for the station. These neighbors use the public key received from the Authentication and Certification Server to do this which will enable them to access the information. The certificate, together with the public keys, enables the network station to authenticate and communicate with any other nodes on the network. The station will also be able to confirm that the stations around it are valid from their certificates.

There are many certificate standards available that can be used in this process. The procedure may typically be as follows:

When a probe or transmission is received by a station from a sending station, the receiving station will verify that the certificate received is signed by the Authentication and Certification Server's private key, by using the public key of the Authentication and Certification Server. Each receiving station then has sufficient confidence that the station displaying the certificate in the probing and in the transmissions is a legitimate station on the network. By then checking whether the transmissions are signed by the particular station, by using the sending station's public key provided in the certificate, the receiving station is in a position to also verify that it was indeed signed by the sending station (which will have encoded the certificate with its private key). As each station in a relaying path will have already verified the validity of its neighbors through the probing in advance, each can assume that the certified Stations are safe without further interrogation during any relay process. Any false probes can be identified and, if necessary, reported to the Authentication and Certification Server.

To ensure security of data transmissions, each station in the network will encrypt all packet headers with its certificate private key. Certain probes (key probes) will not be encrypted, typically every tenth probe, and will contain only the station's certificate. Any other stations with the correct Authentication and Certification Server public key will be able to verify the identity and public key of the transmitting station. These key probes are only used to pass certificates. All other transmissions (not being the occasional key probes) will be encrypted, and key probes will not be used to adjust routing tables or any other adaptation parameters. Moreover, stations will not respond to key probes, but will only respond to probes and packets that have been encrypted and verified.

Other stations wishing to communicate with a station securely can obtain the certificate of the destination station and then use its public key for encryption, so that only the destination station can decode the message with its certificate private key. On the other hand, to prove that the message being sent actually emanates from a particular station, the station's certificate private key may also be used. So an absolutely private message could be signed with the destination station's public key, then again with the sending station's certificate private key. Using the sending station's public key, the destination station would verify the source, and then using its own certificate private key it could access the message.

The certificate of any station on the network can be obtained by any other station on the network through the probes received, or it can be requested from the station (in a manner similar to fast probing), or from the Authentication and Certification Server, or from any other station that might have access to the certificate. Provided the Authentication and Certification Server public key decodes the certificate, a station will be able to verify that the certificate is genuine.

The private key, public key encryption algorithms (such as RSA) may become cumbersome and processor intensive in certain circumstances. In these situations, to increase speed, faster and more efficient encoding (DES or AES, for example) can be used once contact is made. In such symmetric encoding, the communicating stations exchange the secret keys (Ksym) and the symmetric key exchanged is encoded with the recipient's public key (so that only the recipient can open it with their own private key). As the keys (Ksym) will only be valid for the duration of the communication, or a predetermined smaller time interval, the communications are unlikely to be deciphered in the time available. All subsequent messages can be encoded using the Ksym in this manner, and this will provide end to end communication security between source and destination.

The Station Location Recording and Matching Sarver

In a simple embodiment of the invention, every time the stations on the network communicate with the Authentication and Certification Server, which they are required to do regularly, they send a message up a routing gradient to the Authentication and Certification Server. Information is recorded in the message sent up this routing gradient regarding the path it followed; and, significantly, it is possible to determine which internet concentrator stations the message passed through in reaching the Authentication and Certification Server. The Authentication and Certification Server will usually use this information in order to respond to the station. Any relaying stations, including the concentrator station, will annotate the message with details of the connectivity as the massage passes through. If necessary, the procedure could require that any concentrator station utilized en route additionally provides a signed certificate so that the Authentication and Certification Server can confirm that the concentrator station was actually utilized, in order to prevent any malfeasance on the network.

This is a useful process, as the information can be logged at a Station Location Recording and Matching Server. The Station Location Recording and Matching Server is then able to monitor the location of stations relative to one another and match relevant stations as needed (wireless stations to neighboring concentrator stations; and concentrator stations to their wireless neighbors and other neighboring concentrator station neighbors, as well as telephony and Internet gateway stations, etc). The Station Location Recording and Matching Server consequently maintains all of the information relating to how stations can communicate in the network and, together with other the network management server, can establish whether station activity is legitimate, the quality of the connectivity in the network, the charges to be incurred by users, etc.

There are many ways in which the interaction between the network stations, the Station Location Recording and Matching Server and the Authentication and Certification Server can be carried out. One simple option is that when a station attempts to communicate with the Authentication and Certification Server for authentication, or for updated keys and certificates, if the station is valid the Authentication and Certification Server will make this gradient information (used by the station) available to the Station Location Recording and Matching Server, using secure communications. In this methodology, the packet sent by the network station could be routed to the Authentication and Certification Server, and the information then provided to the Station Location Recording and Matching Server.

Alternatively, and in fact preferably, the packet could be sent initially to the Station Location Recording and Matching Server by the station, and then forwarded on to the Authentication and Certification Server only if authentication is needed. The Authentication and Certification Server could then interact through the Station Location Recording and Matching Server back to the wireless station. This latter option would also reduce the functionality and interactions required of the Authentication and Certification Server to only authentication and certification operations. However, in these circumstances, the Station Location Recording and Matching Server would be vulnerable to abuse by unauthorized stations, so the Station Location Recording and Matching Server could flag the location of the station involved as unauthenticated, but should be able to validate the concentrator station used. The Authentication and Certification Server could then return a confirmation that the station is valid if appropriate. The value of this approach is that the Authentication and Certification Server does not actually have to maintain connectivity with all the stations on the network, but only maintains connectivity through the Station Location Recording and Matching Server; and there may be multiple Station Location Recording and Matching Servers as detailed further in this specification below.

As the Authentication and Certification Server has ultimate authority of the network management, it is potentially an ultimate point of failure for the network. This is an inherent weakness of all systems with a network hierarchy; but the problem is largely mitigated by requiring the minimum number of interactions with the Authentication and Certification Server. Where the Authentication and Certification Server is doing as little as possible, it does not play a role in many of the processes in the network processes and consequently the risk of it affecting the connectivity of the network is reduced. There are ways of providing redundancy for the Authentication and Certification Server, or distributing its functionality, but it may be preferable to rely on protective functionality in lower hierarchical levels of the network in the first instance where the impact on the overall network is confined.

In preferred embodiments the role of the Authentication and Certification Server is restricted and its use is largely dependent on the frequency of certification requirements. A Station Location Registration and Matching Server assists the network management process more regularly and its activity will be largely dependent on the mobility of wireless stations and the need for changes in the use of concentrators by wireless stations accessing the auxiliary network. A Network Monitoring Server plays a less frequent role, which depends on the health status of the network.

The basic station network management hierarchy is consequently set out in the schematic diagram of FIG. 2. At the base level (level 0) the wireless stations and seeds are able to access the auxiliary network through a combination of wired access seeds (not shown) and concentrator stations (at level 1). The wireless stations will maintain gradient information to the Station Location Registration and Matching Server (which does not sit behind a concentrator). When the concentrators authenticate with the Authentication and Certification Server, they are assigned to one Station Location Registration and Matching Server (at level 2), although the concentrators might be given information about additional Station Location Registration and Matching Servers as well, as discussed below.

Each of concentrator stations utilized will be maintaining gradients to its own allocated Station Location Registration and Matching Server and to certain other concentrator stations ("well Connected" stations and "neighbors on demand" stations) as needed. The Station Location Registration and Matching Server and the concentrator stations will also maintain each other as neighbors and the Station Location Registration and Matching Server records all the wireless stations in connectivity with the allocated concentrator stations, as well as having (or having access to) the addresses of certain gateway stations, to "real" internet (browsing), telephony and other applications.

The Authentication and Certification Server (at level 3) resides at the top of the hierarchy (behind a concentrator) and maintains records of all the stations and servers on the Global ODMA network, including the ODMA smartcard address, security information and the authorities available to the stations. Also, a record will be kept of the concentrator stations and wireless stations associated with each Station Location Registration and Matching Server, and the gateway stations available.

The preferred approach for initial authentication and receipt of certificates is illustrated in FIG. 3. The wireless stations are activated, and permitted limited access for authentication purposes, through a gradient via the best concentrator station with which it is in connectivity, to the Station Location Registration and Matching Server. The concentrator station utilized by the new wireless station annotates the message on the way from the wireless station to the Station Location Registration and Matching Server with which it is associated. The Station Location Registration and Matching Server records details of the wireless station's connectivity to the particular concentrator (and may flag the record as being an unauthenticated station). The authentication request is then sent on to the Authentication and Certification Server, together with information relating to the concentrator station utilized. The Authentication and Certification Server records the Station Location Registration and Matching Server that was utilized, and typically interacts back to the wireless station through the Station Location Registration and Matching Server (which can route through the same concentrator station or a different concentrator station as appropriate).

The Authentication and Certification Server could interact directly with the station being authenticated, but the preference is to minimize its communications so it will usually communicate through the Station Location Registration and Matching Server. To this extent, to the Station Location Registration and Matching Server, the Authentication and Certification Server is just another station with which to interact even though it is higher in the hierarchy as such, and every station will interact through the Station Location Registration and Matching Server. As every station logs to the Station Location Registration and Matching Server it can map every station, even if it is temporarily unauthenticated, In FIG. 4, for example, three wireless stations (1, 2 and 3) attempt to authenticate through the paths illustrated (paths a-c for each station, via appropriate concentrators and the Station Location Registration and Matching Server assigned to the concentrators). Upon authentication, the responses (paths d-f) are passed back through the assigned Station Location Registration and Matching Server; which in this instance has reassigned station 2 to a more appropriate concentrator (because, for example, the wireless stations may have moved, or the initial concentrator may be more heavily loaded, or the connectivity between the wireless station and the concentrator is degraded, etc).

As most server activity involves the Station Location Registration and Matching Server, it is a significant hub and should be easily recreated if necessary and have redundancy. Therefore, it could map to more than one Authentication and Certification Server and keep more than one gateway as a neighbor. Moreover, by virtue of its role, the Station Location Registration and Matching Server can keep track of what is certified and trusted.

If a Station Location Recording and Matching Server should fail, the concentrator stations will become aware of this quickly as they maintain the Station Location Recording and Matching Server as a neighbor. Concentrator stations could have already been instructed to maintain connectivity with other Station Location Recording and Matching Servers for redundancy, or may have access to the address of other Station Location Registration and Matching Servers to try or other stations that can provide access this information (on hot standby), or alternatively the concentrators could contact the Authentication and Certification Station in such circumstances for allocation of a new Station Location Recording and Matching Server.

The main reason for providing the network with the facilities of the Station Location Recording and Matching Server is to enable the matching of concentrator stations with other stations (as described in International Patent Application PCT/IB2006/001274 and in respect of the Global Network). This enables the Station Location Recording and Matching Server to assist in the location of intended destination stations, and matching suitable concentrator stations and gateway stations in order to initiate the communications.

An example of this process is illustrated in FIG. 5, following the initial authentication process provided in FIG. 3 or 4. Here, a wireless station is shown communicating with the concentrator for connectivity to the auxiliary network. This station could be stations 2 and 3 that were associated with this concentrator as depicted in FIG. 4, but it will be appreciated that the station could also have been station 1 from FIG. 4 if it had moved, or if improved connectivity was achieved through the second concentrator.

When the stations change the concentrator station used to access the auxiliary network, this information is provided to the Station Location Registration and Matching Server (as shown, here the same Station Location Registration and Matching Server is allocated to both concentrator stations). If any station wishes to communicate with a gateway (for real internet access, for example) the Station Location Registration and Matching Server can match the station with an appropriate gateway station. The Station Location Registration and Matching Server will typically have the knowledge of relevant gateways, but could request the information from the Authentication and Certification Server for details if needed. The gateway and the concentrator stations then form neighbors on demand and routing between the wireless station and the gateways will take place through appropriate concentrators that might be utilized to access the wireless station. Generally the Authentication and Certification Server will not need to be utilized at all.

It should be appreciated that once authenticated, connectivity between stations only needs to rise up to the hierarchical level necessary or appropriate. So, for example, two wireless stations might communicate only wirelessly without interaction with a concentrator. Also, the wireless stations might communicate wirelessly to wired access seeds (higher on the hierarchy) that are attached to the concentrator. As the concentrator maintains records of wireless stations that could utilize the concentrator, it may assist in routing the messages over ODMA over Ethernet through other wired access seeds, before transmissions return to wireless communication; again without interaction through the concentrator in such circumstances.

Only if the wireless stations cannot communicate in this manner, or if the cost function to destination is too high, will access over the auxiliary network be required (through the concentrators). In this manner the amount of overhead transmissions through the auxiliary network is minimized as the concentrators able to filter out some activity that does not need to pass to the IP side. If concentrators are utilized, an if neighbors on demand have already been developed (well connected neighbors), there may be no need to trouble the Station Location Registration and Matching Server; and if stations are authenticated there is no need to trouble the Authentication and Certification Server. In this manner, utilization of stations in the hierarchy is optimized.

The function of the Station Location Recording and Matching Server may be distributed appropriately, by region or service provider for example. Typically, where the process provides that the Station Location Recording and Matching Server is the initial server contacted, the Station Location Recording and Matching Server will report to the Authentication and Certification Server that an unfamiliar wireless station has attempted to make contact. The Authentication and Certification Server can, after authenticating the validity of the station, then map the allocated spaces or fields provided in the station's smartcard address to the appropriate Station Location Recording and Matching Server. Alternatively, the Station Location Recording and Matching Server could determine that another Station Location Recording and Matching Server is responsible or better suited for the monitoring and management of appropriate stations through which the communications could be made.

This is especially relevant in roaming situations and, in such circumstances a station attempting to be authenticated in a new region might be directed by a neighboring concentrator station to the regional Station Location Recording and Matching Server, which would then ascertain from the smartcard that a different Station Location Recording and Matching Server is responsible or it could enquire from the Authentication and Certification Server. Alternatively, the user station might automatically look for its own allocated "home") Station Location Recording and Matching Server at a known address, and might then be directed elsewhere (possibly after interaction with the Authentication and Certification Server) to a Station Location Recording and Matching Server in the region of the user.

Depending on the roaming arrangements between service providers and regions, the station's original Station Location Recording and Matching Server could take over, or act as an intermediary by obtaining and sharing relevant information with the new regional Station Location Recording and Matching Server, or the new Station Location Recording and Matching Server could be asked to assist the station and report back to the original Station Location Recording and Matching Server. For example, if the home Station Location Recording and Matching Server knows where the station is, it can advise other stations in the home region where to find the station by contacting the other Station Location Recording and Matching Server or advising the new station to do so. There may also be hierarchical levels of Station Location Recording and Matching Servers, where the higher level station merely advises on the local Station Location Recording and Matching Servers through which stations are roaming, or the local Location Recording and Matching Servers could provide details of changes to the indexed higher level Station Location Recording and Matching Server. There are obviously other permutations that might be relevant.

In any event, the task of monitoring the stations locations and matching them to other stations can be spread out over several servers, or there could be several Station Location Recording and Matching Servers that all interact with a centralized managing server (typically the Authentication and Certification Server). Preferably the Station Location Recording and Matching Server utilized is not changed often, as the concentrator stations would become over-utilized. Instead, the Authentication and Certification Server to the station (through its smartcard address) merely allocates and keeps a record of the Station Location Recording and Matching Server actually managing the concentrator stations at a given time. It can then request or receive information about wireless stations as needed from time to time in order for it, or other stations that it controls, to communicate with the station.

The process of changing Station Location Recording and Matching Servers is shown in FIG. 6. If the wireless station moves again from the position depicted in FIG. 5, or if the concentrator or Station Location Recording and Matching Server fails, or if connectivity is degraded, it may be that a new concentrator is used that is associated with a different Station Location Registration and Matching Server, or the concentrator may be allocated to a different Station Location Recording and Matching Server. The concentrator station utilized will consequently inform its assigned Station Location Registration and Matching Server. As the gateway will know where communications are originally arriving from, and because the wireless station can provide the new concentrator station with the gateway's address, the wireless station and gateway will maintain contact through the appropriate concentrator station's neighbors on demand automatically.

The new Station Location Registration and Matching Server will notify the Authentication and Certification Server, which will update its records. If a certain time without contact between the Station Location Registration and Matching Server and wireless station expires, the Station Location Registration and Matching Server might inform the Authentication and Certification Server. Conceivably, two Station Location Registration and Matching Server stations could be in contact with the wireless station at a given time (where it is in good contact with two concentrator stations allocated to different Station Location Registration and Matching Servers, especially while neighbors on demand are being maintained). The Authentication and Certification Server will simply maintain the latest, most recent record. As the gradient to the Station Location Registration and Matching Server changes from the wireless station, it is likely to register its location through the concentrator with least cost to the Station Location Registration and Matching Server.

In FIG. 7(a) there is shown an example of a wireless station which is attempting to contact other destination stations on the network. If the station is not in wireless connectivity, it can approach its Station Location Recording and Matching Server for assistance. The Station Location Recording and Matching Server in this instance happens to control the concentrator station in contact with the destination station. So in this instance the concentrators may already know of other concentrators in connectivity with the destination without reference to the Station Location Recording and Matching Server (and the neighbors on demand will set up automatically by means of a probe message 2b which is transmitted across the auxiliary network) or the Station Location Recording and Matching Server assists (message 2a enquires about the location of suitable concentrators in communication with the wireless station, and the Station Location Registration and Matching Server informs (3a) concentrators on both sides which concentrators to probe) in setting up the neighbors on demand. The concentrator sends a probe (4) and thereafter the destination interacts with the wireless neighbors on its side (5, 6) and back through the neighbors on demand (7) to the originating station (8). It should be noted that there is no interaction required whatsoever with the Authentication and Certification Server in this example, and the Station Location Recording and Matching Server would only be used if needed, thereby minimizing the loading on these servers.

Where the destination is farther away, the Station Location Recording and Matching Server might need to contact the Authentication and Certification Server for information (alternatively the initial Station Location Registration and Matching Server may keep other Station Location Recording and Matching Servers as neighbors or as neighbors on demand at this level, in which event the Authentication and Certification Server would not be troubled). The process is illustrated in FIG. 7(b).

After being contacted (3), the Authentication and Certification Server will refer the initial Station Location Recording and Matching Server to the appropriate Station Location Registration and Matching Server on the destination side (4) (and may inform that server and/or ask it to provide the information) and the first Station Location Recording and Matching Server will obtain the concentrator stations to probe as neighbors on demand (5), which information will be returned to its own side (6) to set up the interaction (7). The stations will then communicate, although the destination side Station Location Recording and Matching Server will still be updated occasionally so that it can help out if required.

Any Station Location Recording and Matching Server used, will still forward the message to the Authentication and Certification Server for station authentication as needed and report to the Authentication and Certification Server which Station Location Recording and Matching Server is being utilized. The Authentication and Certification Server can then authenticate or update the security features of the station and report to the regional and home Station Location Recording and Matching Servers. The Authentication and Certification Server functionality can also be distributed, with the appropriate Authentication and Certification Server to be used being identified from part of the ODMA address space or field, or by accessing a central authority that provides this information.

Database Security

In addition to the security in transmission of information over the network, the actual information on the server databases will be encrypted and protected using the smartcards. If the server is stolen, not only will the smartcard be disabled, but the data itself will we encrypted. Furthermore, different pieces of the information can be stored in a distributed database across different units, rendering the utility of any partial information that might be accessed less valuable.

Smartcards

Smartcards comprise a processor, write-only memory, read/write memory, and encryption engines. Smartcards are typically used only in the initial stages of the security procedures. They are not generally used in the interactions between neighbors, as they will tend to have less processing resource than the unit itself and the limited exercise of the smartcard authentication functionality minimizes the potential for compromise of the procedures utilized. Instead, the Authentication and Certification Sarver generally writes configuration information onto the smartcard in a secure manner, which is accessed by the unit in the communication procedures. If the smartcard is moved to a new unit, the configuration and services available is still recorded on the card and this user information can be utilized by the unit.

In addition, other Service Providers or Application Providers can use the storage and processing capacity of the card and support custom applets. If the card is removed from a unit, the cache of information accessed will be deleted from the unit. The Application can also have its own algorithms utilized by the smartcard itself, over and above the standard ODMA authentication algorithms, and these, applications would also reside on the card.

Network Management and Billing

Whenever certain stations are used in the network, it Is possible to maintain records of each occurrence and thereby manage the applications available, charge for them and monitor the overall "health" of the stations and the network. For example, if a message is routed through a gateway (for Internet browsing purposes), after verifying the legitimacy of the station and the authorities available to the stations (through the Authentication and Certification Server certificate) the services would be provided and records could be retained. These records could then be passed on to the appropriate management authority.

For example, the Billing Server could receive details of throughputs utilized, the initiation and termination of the services, and the applications utilized, for billing and credit purposes; while the Network Monitoring Server may receive details of the units using particular gateways (originating and destination), and the quality of service (information on packet loss ratios, noise floor, interference, numbers of neighbors available, software version/upgrade used, etc) for network management and authentication (confirmation) etc. The Network Monitoring Server can send new software out to stations, for upgrades or new applications, or it can reconfigure parameters to fault-find and analyze connectivity between stations, make the network run efficiently or report problems.

Obviously, stations in communication with Network Management and Billing Servers, etc, will check to confirm the Server stations are valid through the certification, before allowing themselves to be managed. Furthermore, the Authentication and Certification Server can specify the extent of management authorized in the certificates as well.

Not only does each station itself keep track of its usage, but other stations also report information relating to usage at certain points (such as gateways and Internet concentrator stations) which may be cross-referenced with that provided by the station itself. All this information is utilized by the Billing Server repository and the subscriber is charged appropriately. If there is any reason to terminate the service, the Authentication and Certification Server simply stops providing public keys and certificates rendering the unit inoperative.

Details relating to new Service Provider subscribers and smartcards will be captured on an ODMA enabled Service Provider provisioning unit (which will be required to authenticate using a smartcard like any other stations) and the subscriber will be provided with a unit and smartcard as required. The information is captured and provided to the Authentication and Certification Server, and the new subscriber will be able to activate services. The Service Provider may be empowered to log in to the Authentication and Certification Server in order to request accounting records and usage patterns of subscribers and/or relevant information can also be provided to the Service Provider's registered database from time to time. For example, the Service Provider could receive detailed tracking information in respect of the health of the unit, the services used, services provided, any upgraded services etc. If a unit is faulty or unauthorized, an alarm can be generated and reported to the Service Provider for appropriate action.

The stations reporting back to a Service Provider's Network Monitoring Server need confirmation that the entity is authorized. These network management entities can be placed in the overall network management hierarchy, between the Authentication and Certification Server and the Station Location Registration and Matching Servers, and can be provided with sufficient authorization that enables certain of these entitles to be responsible for the user stations. The process will likely involve a station reporting in to the Station Location Registration and Matching Server, which will have knowledge of the station's geographic location and which will contact the Authentication and Certification Server; which having access to the relevant Service Provider information can arrange authorization based on the Service Provider and the capabilities available.

Beneath the Authentication and Certification Server there may also be provisioning software systems controlled by the Service Providers. The Authentication and Certification Server uses the information received from the provisioning systems and issues certificates, which could include details of the relevant network management entities to which the user stations are to report. Once allocated, the stations can log in to the network management entities and provide information intermittently or on demand, such as neighbor tables, local conditions, connectivity characteristics, performance metrics (such as round trip ping delays, failed connection attempts, throughput and performance) and other parameters at the station to ensure the system is correctly set up. The Network Monitoring Server could provide certified commands to the station (such as to increase power, or to limit certain functions), for remedial or fault finding purposes, or simply to test the network.

The shared responsibility of the Authentication and Certification Server (which provides ultimate authorization to conduct the activities) and the Network Monitoring Server that sets parameters are to some extent interlinked. The Network Monitoring Server may discover a problem (for example that certain seed stations in an area have failed) and could report this to the Authentication and Certification Server. Either the Authentication and Certification Server or the Network Monitoring Server could trigger an alarm to the Service Provider to repair the coverage area; end the alarm sent could include relevant information relating to the problem (failed antenna, high noise floor, etc). Indeed the unit itself might trigger the problem to the Network Monitoring Server, which will inform the Service Provider. The Network Monitoring Server may apply to a particular Service Provider or it could be monitoring stations for multiple Service Providers, or it could monitor the entire ODMA network, changing parameters across many Service Provider networks and limiting the ability of the Service Provider to change only certain functions.

Generally, Service Providers of sufficient subscriber base will use standard simple network management protocols (SNMP) on standard systems to manage certain functionality. However, the core ODMA functionality would be controlled at a higher level as the SNMP systems are not compatible with certification processes. Consequently, instructions such as changing the probing channels, or defining the maximum transmission power allowable, or software updates will be undertaken at a higher level than the Service Provider. The levels of authority are set at the Authentication and Certification Server which assigns the stations with authority and sets the levels of authority.

The aim in the ODMA network is to avoid the extent of active network management required of a conventional network. ODMA is self organizing and largely self managing. However, where regulations require specific controls (such as in radar usage areas) or in high interference conditions it is imperative that the stations receive consistent commands and instructions and the Station Location Registration and Matching Server, the Authentication and Certification Server and the Network Monitoring Server need to orchestrate their functionality to ensure the communications are not contradictory.

The Station Location Registration and Matching Server has knowledge of the regional location of the stations and the concentrator stations that are in communication with them. The Authentication and Certification Server has knowledge of what is permitted and which stations are in communication with the Network Monitoring Server. The Network Monitoring Server has knowledge of the concentrators and the geographic location and may know more than the Station Location Registration and Matching Server in respect of connectivity conditions and station deployment, but will require the Station Location Registration and Matching Servers assistance in controlling regions in the network.

The Network Monitoring Server could also be assigned only certain tasks; for example managing user stations only, or concentrators only, or infrastructure only, or any combination of stations. The Network Monitoring Server would then communicate with other systems to upgrade infrastructure or to render repairs etc. The Network Monitoring Server may also manage the staff that solves the problems identified in a two tier service provision structure where the operators provide and/or manage the infrastructure and the Service Providers manage the subscribers utilizing the infrastructure and the smartcards of the user devices.

However, the Service Provider may need information regarding the gateways that are available to subscribers. The Service Provider determines the quality of service and the number of subscribers, and the provisioning software communicates this to the Authentication and Certification Server. The gateway stations receive certification from the Authentication and Certification Server, and the Network Monitoring Server and Station Location Registration and Matching Server are then informed that the gateway is active so that staff can be assigned to ensure the engineering management. If a gateway fails, or suffers from reduced functionality, or is overloaded, an alarm can be triggered to the Authentication and Certification Server and/or to the Service Provider for repair. Gateways can provide differentiated functionality to many different service applications and to different Service Providers.

It should be evident that the Station Location Registration and Matching Server could manage the loading on the gateways by directing users to certain gateways. Here the concentrators might not be allocated to the gateways as such, but instead the concentrators are instructed to use one or more gateways in relation to the specific user. This determination could be made by grading quality of service levels for ordinary and premium users, who will be permitted to use certain gateways, or the load could be distributed evenly. Depending on the costing structure of the gateway service, it may be appropriate to assign users to one gateway until it overflows into another, or the load could be distributed over all the gateways available. Many alternatives are possible.

The Network Monitoring Server can constantly monitor and chart stations in connectivity with each other, connectivity conditions, and the general condition and health of the network; and analysis of the information may determine where additional infrastructure may be required. This can operate on two levels, namely the monitoring of subscribers to detect resource issues or to detect network problems, Service Provider problems or general network problems which can then be dealt with at an operator or Service Provider level.

It will be appreciated that an operator will have access to more information than any Service Provider, where information will be limited at best to the Service Provider's network. However, even though an alarm may be triggered by something that is outside the control of the Service Provider, the Service Provider may need to have knowledge of the condition to analyze customer satisfaction and quality of service issues. The Service Provider may have its own billing records and may also download records from the Authentication and Certification Server which can be reconciled to show where other Service Provider or operator infrastructure was utilized and thereby establish where stations might need to be configured and generally assist in network planning.

Any Network Monitoring Server should be able to control smartcards through the log-in functionality to determine the extent of applications available to the subscriber. In theory, any number of Network Monitoring Servers can be configured according to the rules provided by the Authentication and Certification Server, and the Station Location Registration and Matching Servers will have knowledge of the Network Monitoring Servers in communication with each other so that they will not be operating on contradictory instructions. However, it is also important to prevent too many stations having access to the same level of authority which means the typical distributed ODMA network management will be positioned between a Telco network and a self-operating network in the hierarchy, as some level of flexibility is needed which is controlled through certification.

Although all the functionality of the Network Monitoring Server, Station Location Registration and Matching Server and Authentication and Certification Server could be combined, there is benefit in splitting the functions as the Network Monitoring Server might help sub-groups whereas the Authentication and Certification Server is likely to control an entire region. Although the Station Location Registration and Matching Server is generally utilized for location registration, it might also be able to provide additional information automatically or upon request to the Authentication and Certification Server or Network Monitoring Server; for example, providing information that extra subscribers are in a particular area. The Network Monitoring Server could be instructed to manage the subscribers, or the subscribers could be instructed to report to the Network Monitoring Server.

Engineering teams deploying concentrator stations and other infrastructure should also report to the Network Monitoring Server that the new equipment is active. The Network Monitoring Server then reports to the Authentication and Certification Server, effectively serving as a provisioning system for the infrastructure. As additional coverage becomes available in a region, this may be communicated to the Service Providers so that they may offer service in that area. Where Service Providers request coverage in a particular area, the Network Monitoring Server could be used in planning the infrastructure required.

The overall network management system may attempt to set limits in certain circumstances; so that even where a subscriber station has valid certification and authority certain instructions may be ignored in order to repair or test infrastructure. Stations can also be instructed to send test messages, send reports, or perform test routines or procedures to evaluate service; and stations may even be switched off to evaluate the effect on the network (to determine seed requirements, for example). In other words, stations in the network can assist in creating conditions to evaluate service or resolve problems. In addition overall network performance may be limited, even if contrary to provisioning requirements, in order to allocate users temporarily to gateways of other service providers while certain infrastructure is repaired, or in the event of failure, and the use of the Service Provider equipment can and billed later. Additionally, an operator may have emergency gateways available for this purpose to assist Service Providers or to manage over Service Providers generally and then reconcile accounts thereafter.

Network Overheads

One concern that may be raised relates to the operational resource overhead consumed by the network undertaking all the authentication, location registration, usage reporting and billing. This is a design parameter of the network, but is negligible in relation to the overall use. Reports may be sent every 10 minutes, for example, and after data compression will be no larger than about 100 kb. If there are one million stations in the network, only 1,700 of them will be reporting in a given second, which will amount to only 170 Mbps of throughput each second over the entire network.

Assuming there is at least one concentrator station for every 1,000 users on the network (a very conservative number), then there will be 1000 of these concentrator stations for the one million users; and the average load through any one station will be 170 kbps, when it is typically capable of transferring over 5 Mbps. The Authentication and Certification Server will also distribute aspects of this functionality so that it is not itself a bottleneck and so that there is duplication and redundancy available to ensure the network will not fail.

Shared Utilization of Service Provider Resources

As various units on the network may be provided by different Service Providers, it is possible to utilize the services available through other Service Provider networks if this is desirable. The certificates provided to stations by the Authentication and Certification Server will specify whether this is possible; for example, whether the messages of one Service Provider's subscriber can be routed through the gateway of another Service Provider. The Network Monitoring Server will be able to determine usage and consequently the central Billing Server is able to apportion charges for such usage through reconciliation between the Service Providers themselves at the Service Provider level, or by crediting one Service Provider for the use of its resources by a particular station and debiting the subscriber's billing appropriately. For this purpose, call description records can be generated that are configured to facilitate billing, such as the subscriber and destination, time of messaging, duration, quantity of data up/down loaded, movies watched etc).

Each Service Provider's own billing management devices will invoice their own subscribers after interacting with the Billing Server in this manner, and will be able to manage their networks based on the reported health and usage patterns of their subscribers. For example, in areas where gateway of a competitor Service Provider is being extensively used by the Service Provider's subscribers, it may chose to provide its own capabilities on more accessible basis. However, new Service Providers will be able to provide high quality of service with little infrastructure deployment if it is prepared to pay an incumbent for the privilege (both benefiting by extra billing), which may be especially relevant in add-on value added applications that are potentially provided.

If a user from an unrelated ODMA network Service Provider attempts to authenticate through a new network (a visitor from another country, for example) the message will pass through a gradient to the Authentication and Certification Server which can determine whether certificates and keys can be returned. If the user has international roaming functionality, the local Service Provider network stations could be utilized by the visitor and the local Service Providers reimbursed by the subscriber's own Service Provider (who can charge the subscriber based on the negotiated package). As the local Service Provider stations are returning information on use, the local Service Provider will be aware of the use and will benefit from the additional revenue or credits. The Authentication and Certification Server can act as a broker of these exchanges, or there can be a pre-established agreement in place between Service Providers.

Server Interfaces

The Authentication and Certification Server and the Service Provider can communicate in any manner that is appropriate, provided appropriate translation interfaces are created. Therefore, if the Service Provider requires information in a higher level language or protocol, such as Simple Network Management Protocol (SNMP), or through RADIUS, this is possible through an agent based at the Network Monitoring Server. The Service Provider will typically not actually be in direct communication with the subscribers, as this utilizes unnecessary resources. Instead the subscriber interface interaction is mimicked at the Network Monitoring Server based on the reports received at the Network Monitoring Server by the stations. Depending on the Service Provider, the Service Provider may only be provided with information and only be permitted to provide instructions to the Network Monitoring Server for action. However, the Service Provider may be authorized to adjust certain network parameters, such as the throttling of throughput to subscribers or through gateways, etc.

Customer Lists and Privacy

The Network Monitoring Server and Authentication and Certification Server do not require actual personal details of any Service Provider's subscribers or their customer lists as such. The Authentication and Certification Server merely maps ODMA unit and smartcard identifiers/addresses to a user (the details of which can be an identification provided by the Service Provider which is mapped at the Service Provider level to actual users). However, this information may be required by government regulatory or enforcement authorities, so typically there will be capability provided to enable access to customer information in appropriate circumstances (the access to information could be controlled by a trusted independent party or through Escrow, for example).

APPENDIX A

ODMA (Opportunity Driven Multiple Access)

An ODMA multi-station network comprises a number of independent stations, which may be fixed or mobile, each of which can transmit and receive data in order to transmit messages from originating stations to destination stations opportunistically via intermediate stations. In order for an originating station to be in a position to send a new message to a destination station via a selected one of several possible intermediate stations, each station must at any time normally be in contact with several other stations. This applies also to the case where stations are required to relay a message from an originating station to a destination station.

In order to do this, each station selects one of a number of possible probing channels to transmit probe signals to other stations. The probe signals contain data identifying the station in question and include details of its connectivity to other stations. Other stations receiving the probe signals respond directly to the probing station or indirectly, via intermediate stations, thereby indicating both to the probing station and other stations their availability as destination or intermediate stations. The probing station evaluates the direct or indirect responses to identify other stations with which it can communicate optimally.

The above described method of opportunistic data transmission between stations of a network is referred to as Opportunity Driven Multiple Access (ODMA) and the principles can be applied over any packet switched network.

ODMA over Wireless

The ODMA-over-wireless methodology is used in a communication network which has a number of wireless stations which are able to transmit data to and receive data from one another. The methodology comprises defining a first probing channel for the transmission of first, broadcast probe signals to other stations. These probe signals can also be referred to as neighbor gathering probe signals. Other stations which receive the first probe signals (also referred to as "slow probes") from a probing station indicate to the probing station their availability as destination or intermediate stations (i.e. as neighbors of the probing station). A neighbor table comprising details of, and connectivity data relating to, these other available stations is maintained at each of the stations.

In an ODMA network utilizing a wireless medium, when there are a number of stations in close proximity they will end up probing at higher data rates and lower transmit powers. Listening stations will occasionally respond to stations that are probing at the lower data rates, or that do not have enough neighbors, to help any lonely (distant) stations (also referred to as "lonely neighbors") that cannot use the higher data rates or do not have sufficient neighbors. Stations will only use the lower data rates when they are lonely and cannot find sufficient neighbors at the higher data rates and at maximum power.

ODMA networks typically utilize two kinds of probing processes, "slow probing" and "fast probing". The slow probing process is used by each network station to gather neighbors, while the fast probing process is used to construct gradients between originating and destination stations.

Each station will transmit slow "neighbor gathering" probe signals at regular intervals (determined by a Slow Probe Timer) trying to find other stations. Stations indicate in their slow probes that they are able to detect other stations probing and in that way stations will vary their probe power until a certain predetermined number of stations indicate they are able to detect the probes. If a station never acquires the required number of neighbors it will remain at the lowest data rate and maximum transmit power.

Each station will randomly vary the Slow Probe Timer slightly between slow probe signal transmissions to avoid collision with other stations. Should any station start receiving another station's transmission, it will reload the Slow Probe Timer with a new interval.

In a wireless network of mobile stations the stations are constantly moving, and as such the number of neighbors will constantly be changing. If the number of neighbors exceeds the required number, a station will start to increase its data rate on the probing channel. It will continue to increase its data rate until it no longer exceeds the required number of neighbors. If it reaches the maximum data rate it will start to drop its slow probe transmit power by small increments until it either reaches the minimum transmit power, or no longer exceeds the required number of neighbors.

When a station replies to another station's slow probe on a Probing Channel it will limit the length of its data packet to the Slow Probe Timer interval. This is to avoid other stations probing over its reply. If the station that is replying has more data to send than will fit in a small packet it will indicate in the header of the packet that the other station must move to a specific Data Channel.

There can be a number of Data Channels defined for each Probing Channel. The station that is requesting the change will randomly select one of the available Data Channels. When the other station receives the request it will immediately change to that Data Channel, where the two stations will continue to communicate until neither of them have any data to send, or if the maximum time for remaining on the Data Channel expires (set by a Data Timer). Alternative data transport protocols could also be used.

When a station changes to the Data Channel it loads the Data Timer. It will remain on the Data Channel for as long as the Data Timer will allow. When the Data Timer expires the stations will revert back to the Probing Channel and start probing again.

The slow probing process consists of three basic functions:
1. Neighbor collection
2. Power learning
3. Ramping of neighbors The process of neighbor collection consists of a station probing at increased levels of power until neighboring stations indicate in their own probes that they are detecting the probes of the first station. The power of the probe is increased until a predetermined number of neighbors indicate that they are detecting the probes.

All probing stations increase and decrease their probe power until all stations have collected a predetermined number of neighbors. This process consists of increasing and decreasing the power level of probes and indicating in probes which other stations' probes are heard. In this way all stations can learn what power level they require to reach various neighbors.

Each time a station probes it indicates its transmit power and noise floor and which stations it has as neighbors. Every time a station hears another station probe it calculates from the probe the path loss and power required to reach the station from the path loss and the noise floor of that station. The path loss to the neighbor and the power required to reach the neighbor are stored in the neighbor table kept at each station. If a neighbor is no longer heard then the path loss and power level required to reach the station are increased or "ramped" in the table until a certain level is reached at which point the neighbor is removed from the neighbor table.

If a station has a message (or other data) to transmit to a station that is not one of its neighbors, for example, a distant station across the network, it begins to transmit fast probe signals (or gradient gathering probe signals) to develop information on how to reach that station. The information is called a gradient and is an indication of the cumulative cost to reach a destination station. When a station starts to fast probe it indicates that it is looking for a destination and neighbors hearing the fast probe will themselves fast probe until the destination station hears the fast probes of its neighbors. The gradient is then built through adding cumulative cost until the gradient reaches the source, and the source can commence to send messages to neighbors using the information developed in the gradients to destination, which in turn can send them to their neighbors until the destination is reached.

Each station keeps a record of the (cumulative cost) gradients to each destination of each of its neighbors, and its own gradient to the destination. In standard ODMA communications, each station only passes messages to stations with a lower cumulative cost to destination. A station can pass a message to any of its neighbors with a lower gradient to destination. Neighbor gathering via slow probing and gradient generation via fast probing allow a station to develop a number of choices of stations with lower cost to any destination that can send messages to such destinations. The neighbors are maintained all the time via slow probing and gradients are only developed on a needs basis when messages/data needs to be sent to stations that are not neighbors.

Each wireless station uses the slow probing process to identify and obtain information from the station's neighbors. A station is considered a "neighbor" in this sense if it has been heard to transmit a neighbor gathering probe message, and details of the neighboring stations Identified will be maintained in each station's neighbor table.

If an identified neighbor has itself transmitted a neighbor gathering probe message that is received by a particular station, and the probe contains information of the particular station's own identifier, then the neighbor is flagged as a "detecting neighbor" in the neighbor table. Typically each station will adapt its neighbor gathering techniques (generally by increasing data transmission rates and by powering down the strength of the probe signals sent out) to maintain approximately 10 detecting neighbors. Of these, a predetermined number of the neighbors with the lowest path loss are flagged as "close neighbors" (for example, five stations). The information obtained from close neighbors may be treated differently or preferentially and the techniques used to transmit the information may also be adapted depending on the neighbors.

If a station is unable to acquire the minimum number of close neighbors when it is transmitting on full probe power, it is referred to as a "lonely neighbor". Other stations that have acquired the required number of close neighbors that can detect the lonely neighbor transmissions will let the lonely neighbor know that they are detected, and may provide additional information to the lonely neighbor.

When not probing or sending other messages, each station is listening for the probes of the other stations. When heard, the receiving station can use the transmit power information provided in the probe to establish the path loss to the station. As each station is constantly identifying the close neighbors with the lowest path loss, these neighbors are likely to be either in direct line of sight, or have the best signal with least interference.

Even stations merely able to listen will be in relatively good connectivity with a probing station in a fully operational network with many stations, as stations sending probes will likely have powered down their transmission levels in order to minimize their number of neighbors. In other words, neighbors are typically chosen for the quality of connectivity. Lonely neighbors are the exception, but will be recognized by the stations (hearing their full power transmissions and determining that they have less than the required number of collected neighbors) and assisted.

ODMA over Wire (over Ethernet and over Internet)

The global ODMA network architecture enables the implementation of the ODMA network over a very wide area, such as in a regional, national or global networks, by integrating wireless ODMA networks with one or more auxiliary packet switched networks using adapted forms of ODMA techniques. The auxiliary network could comprise conventional wired networks, such as Ethernet networks and the Internet, as well as "virtual" wired networks, such as the network created using satellite nodes, or any combination of these networks.

A component of the communication network of the invention is true peer-to-peer connectivity between a large number of moving ODMA subscriber stations, whether they are proximally close together or in different countries. Such peer-to-peer connectivity is offered over an auxiliary network which can use a different transmission medium from the mobile ODMA stations. Several actual "wired" and virtual "wired" packet switched media are available for use in such a "global network", but the most relevant of these media is the Internet or a private "Internet".

To make the overall network connectivity more resilient, the mobile subscriber stations should have many potential access points to the auxiliary network. Ideally, data transmissions should be routed through the most suitable wireless or wired media available at the moment the transmission is being sent onward, using ODMA protocols. To achieve this ideal, the location of the access points with optimal connectivity to the other wireless stations should be known with some certainty at any given time and this information should be refreshed on an ongoing basis due to the movement of the wireless stations. However, the manner in which stations are located should also be achieved without overburdening the auxiliary network medium with unnecessary probing transmissions.

Figure 8:
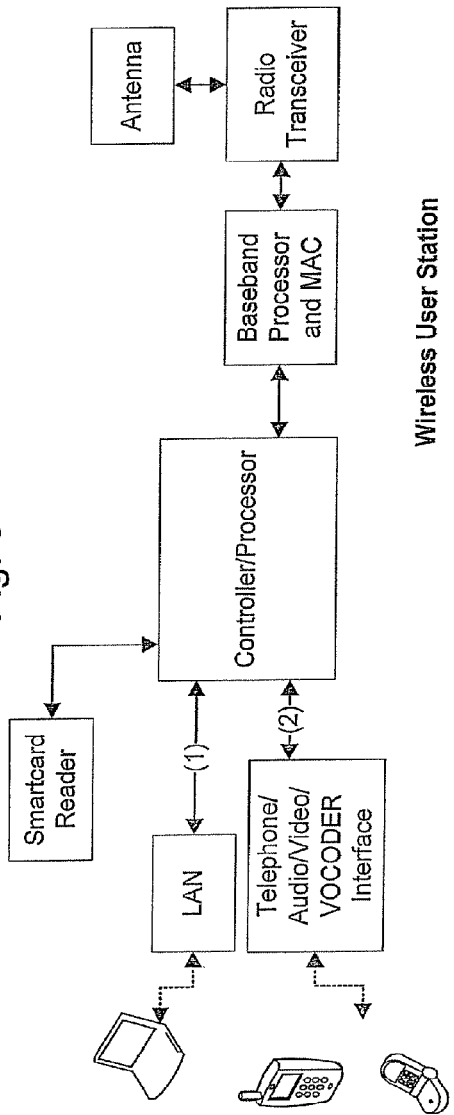
FIGS. 8 to 11 are simplified block schematic diagrams of the major hardware components of various different types of station making up the ODMA global network.
Figure 9:
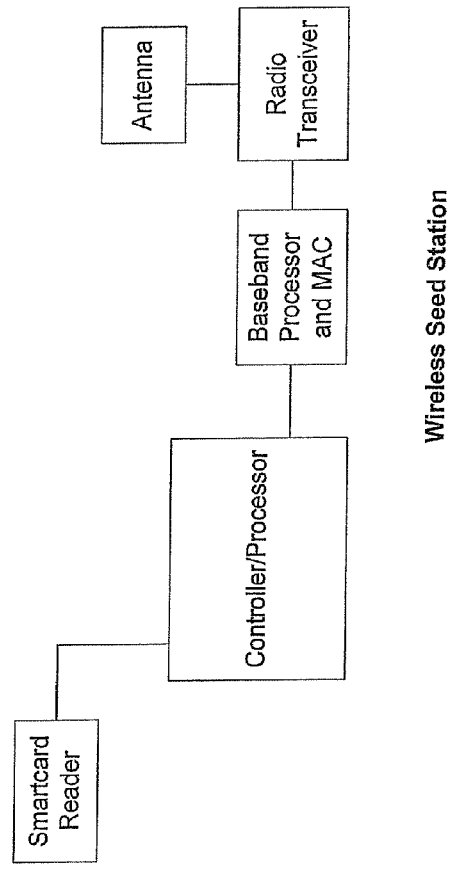

Global ODMA Network Hardware and infrastructure
Wireless Stations (Wireless Subscriber Stations and Wireless Seeds, also referred to as "A Stations")—FIGS. 8 and 9
Wireless subscriber (user) stations are generally mobile wireless radio transceivers that communicate with other wireless subscriber stations and wireless seed stations (which are typically fixed but may be mobile) using ODMA over Wireless. Wireless subscriber stations typically have either an Ethernet interface that enables an associated computing device to receive and transmit data through the unit, or have connectivity to mobile telephone hardware to enable voice data transfer. The wireless stations communicate between themselves using ODMA over Wireless connectivity.

Wireless seed stations are similar to the wireless subscriber stations, providing additional wireless coverage by acting as intermediate stations for use by the wireless subscriber stations in communicating with each other. However, the seed stations generally do not have any other connections or interfaces as in the case of the wireless subscriber stations. Wireless seed stations are typically stationary, fixed installations, possibly having specialized antennas. However, these stations could also be mobile and could be mounted on a motor vehicle or a train, for example.

Figure 10:
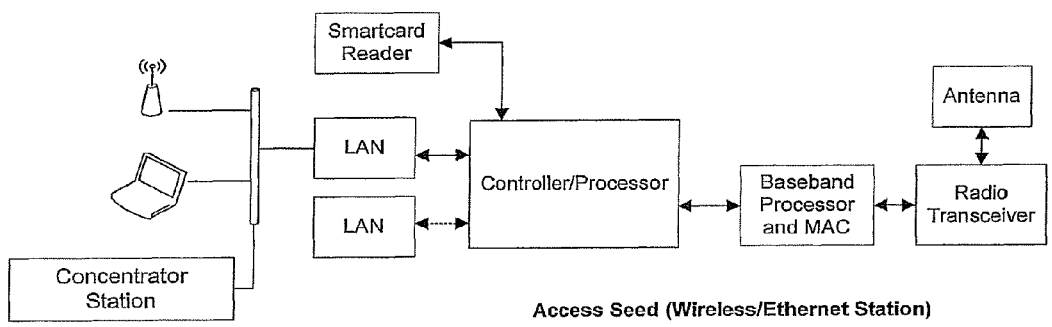

Access Seeds (Wireless to Ethernet Adapters, also referred to as "B Stations")—FIG. 10

The wireless to Ethernet adapters are similar to the wireless subscriber stations and wireless seed stations, but these units have the added capability of being linked together via an Ethernet backbone or sub-network using ODMA protocols due to the provision of an ODMA Ethernet interface. These devices support both ODMA over Wireless and ODMA over Ethernet. The station is similar to a wireless station but the LAN interface card is connected to an ODMA enabled Ethernet. The station may optionally include other LAN interface cards.

The adapters are typically used to create a cluster of wireless access points to increase throughput near an Internet connection point, or perhaps to join several such devices together over a large office Ethernet network. The Ethernet connection will usually be connected in a wired network with several other Wireless-Ethernet stations (access seeds) and a concentrator station (Ethernet to Internet adapter described below). The access seed stations may be located physically remote from the concentrator stations, and the Ethernet connections to the access seed stations may be via regular cabling, or through high capacity microwave links, fiber-optic cabling or the like as required.

Figure 11:
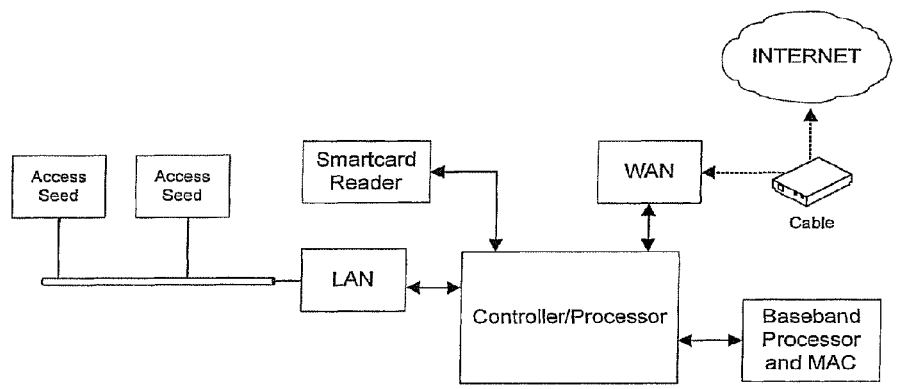

Concentrator Stations (Ethernet to Internet Adapters, also referred to as "C Stations")—FIG. 11

These devices provide a bridge between an ODMA over Ethernet network and the Internet at large and will have a fixed or dynamic Internet (IP) address on the Internet. Each device will maintain a cache of data identifying other concentrator stations that the unit has established are present on the Internet, and is able to locate such other devices by making requests to one or more Station Location Recording and Matching Servers and/or Authentication and Certification Servers. If the concentrator station has a dynamic address then the IP Address Management Server and/or the Station Location Recording and Matching Server will have to keep track of the concentrator station by matching the station with its ODMA address.

The core components of the concentrator stations are the same as for the wireless and access seed stations, but there is typically no wireless connectivity. Instead, a WAN interface (typically a cable modem) and a wired or cable connection to the Internet are provided. An ODMA Ethernet interface connects the station to an ODMA over Ethernet sub-network.

Overview of the ODMA Network Topology

Figure 12:
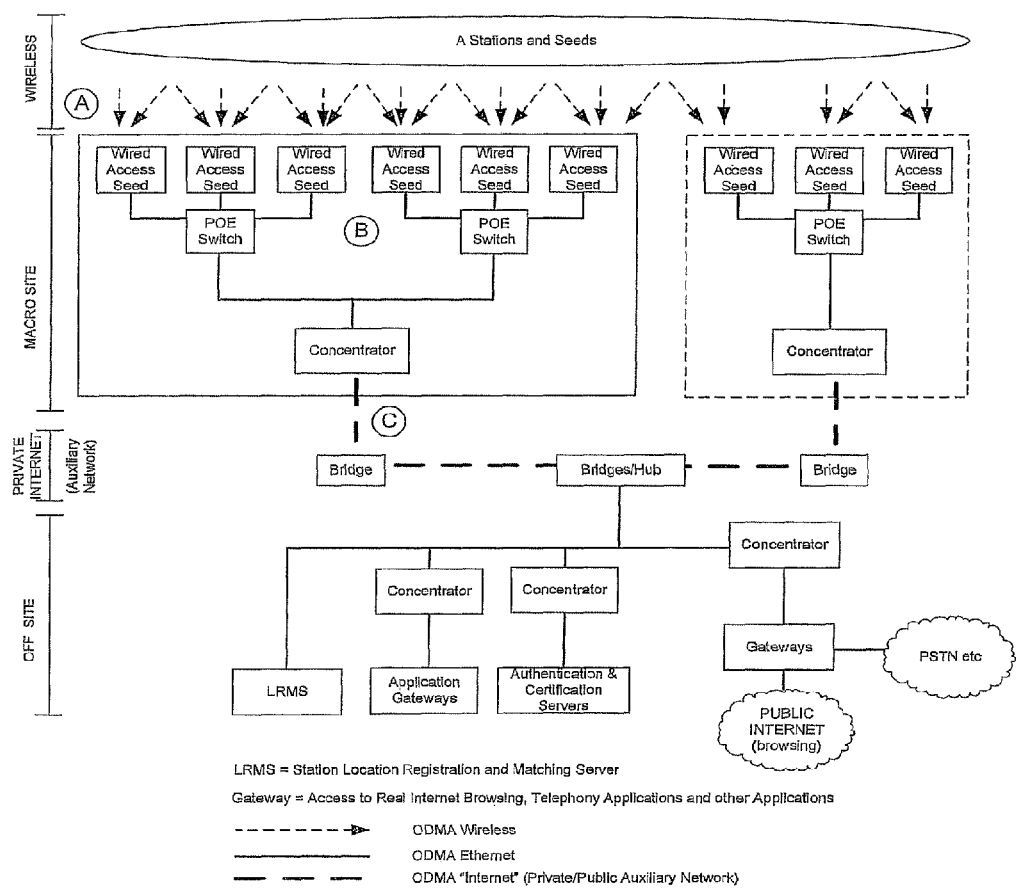
FIG. 12 is a block diagram of typical component station connectivity used in a simple configuration in relation to an auxiliary network utilized for wide area macro coverage.

FIG. 12 shows the topology of the global ODMA wide area network in a simplified schematic form. Message data may be transmitted from one mobile, wireless subscriber station (the originating station) to another (the destination station) within the immediate wireless area (ODMA over Wireless), or over a multi-medium ODMA network. In the global network, the message data is transmitted first over a wireless medium by the originating station, then over a wired medium (over one or more Ethernet networks and the public or private Internet network) before finally being transmitted again through a wireless medium to the destination station.

Multi-Medium Architecture

Various devices in the wide area communication network may be required to handle more than one disparate communications medium in order to communicate from originating station to destination station using the ODMA protocols. Since the characteristics of the various media vary greatly, different protocols and algorithms are adopted to handle the processing of the data transmission through each medium.

In particular, each medium (e.g. wireless, Ethernet and Internet, etc.) with its corresponding protocols (ODMA over Wireless, ODMA over Ethernet, ODMA over Internet, etc.) supported by a device has its own neighbor table and associated parameters which are of relevance to the medium. Neighbor gathering and the gathering of information relating to the quality of connectivity between stations is undertaken separately in each medium as appropriate, depending on the parameters that are relevant for that medium.

The gradient table constructed from originating station to destination station is common to all the various media, regardless of which media are utilized, and the gradients identified would be based on all the relevant neighbor information through each medium. Consequently, it should be evident that the gradient table is independent of any medium through which the data is actually subsequently transmitted.

Whatever the media utilized in the data transmission, the neighbors will operate collaboratively and track their relative strengths of connectivity. However, in a mufti-medium network it is important to ensure that the cost functions used to route the data transmission through the various media are compatible, to ensure that the optimal route is followed.

ODMA over Ethernet

Probing is undertaken via Ethernet broadcast packets. Data transmission is effected via directed Ethernet packets. Since slow probing is done relatively rarely, and neighbor costs are essentially all the same, the neighbor table could have a large number of neighbors relative to other media.

The access seed station can develop sets of neighbors where it is the point of connectivity between different Ethernet networks (each on the sections of the Ethernet joined by the ODMA unit). If one local area network is particularly busy and over utilized for either global or local traffic, the ODMA methodology is applied to the traffic in both neighborhoods. Each Ethernet group of stations cannot see the other group's stations as neighbors, but the access seed station acts as an intermediary which matches stations in each group when appropriate thereby serving as a local area multi-hop relay and facilitating one or more hops over the neighborhoods in the Ethernet medium. It will be appreciated that more than one access seed station could be joined to two (or more) local area networks of this nature.

ODMA over Internet

The general ODMA environment envisages that every wireless station (wireless subscriber stations and seed stations) in the network repeatedly sends updated authentication messages on a periodic basis to the Authentication and Certification Servers. This is typically achieved through the Station Location Recording and Matching Server functionality.

Gradients from each station in the network to any number of potential Authentication and Certification Servers are maintained at all times. These Authentication and Certification Servers (through the Station Location Recording and Matching Servers) interact with any other Authentication and Certification Servers provided on the network to maintain updated tables of information on every station comprising the ODMA network (in fact all ODMA stations of any type will authenticate themselves on an ongoing basis).

When a wireless station sends a packet to the Authentication and Certification Server (up a gradient to the Authentication and Certification Server), it includes the information for the predetermined number of best concentrator stations that it has determined provide the best potential connectivity in the area of the wireless station. Each time an authentication packet is sent to the Authentication and Certification Server it will follow a gradient via a concentrator station and this information will also be added to the authentication packet. The Station Location Recording and Matching Server will consequently always have a relatively current record of the wireless stations that are in the area of certain concentrator stations. In addition, the wireless stations will know how to send an authentication to the Authentication and Certification Server at all times.

When any wireless station (the originating station) wishes to send information to another wireless station (the destination station) that it cannot contact by ODMA over wireless, it sends a packet to the Station Location Recording and Matching Server (typically via the best-placed concentrator stations in its area, although the message could in theory be transmitted over the wireless medium if the Server has this functionality). Packets may be sent to both the Station Location Recording and Matching Server and concentrator stations nearby to establish the best route available from the originating station to the destination station over the auxiliary network, as the destination station might already be known to a concentrator station.

At the simplest level, stations acting as nodes on the Internet do not need to access a Station Location Recording and Matching Server as such. When switched on, with access to the Internet (or other packet switched network), the station will automatically start probing for neighbors. There could be one or more initial addresses provided in the station's hardware to get the process going, and the addressee station(s) probed will provide information in respect of their own "well connected" neighbors and thereby advise of other stations that could be probed. All stations will ultimately locate each other in this manner as more addresses are made available to probe. As these neighbors are generally well connected, it is likely that they will have good connectivity with other well connected neighbors which ensure optimal transactions generally.

As each station maintains lists of wireless stations with which it is potentially in contact, a station on the Internet can locate wireless stations through this probing mechanism as well. The neighbor tables of the stations are updated on an ongoing basis, so any station should be able to keep track of well connected neighbors of its own and those of the destination station (whether on the auxiliary network or the wireless network). Once found, the key stations to probe as "neighbors on demand" can be updated continuously for as long as needed.

Assuming that the destination station is not immediately known to the concentrator stations or their immediate neighbors, the Station Location Recording and Matching Server will then determine the last known location of the destination station and establish from its tables which concentrator stations appear best suited for connectivity between the originating and destination stations. The Station Location Recording and Matching Server will tell the concentrator stations on the "originating side" of the Internet which other concentrator stations to probe via UDP on the "destination side." The best concentrator stations (as may be determined on an ongoing basis thereafter) in the region of the originating and destination stations will then be probing each other as long as the stations on both sides of the Internet "hop" require a gradient between them.

The invention claimed is:

1. A method carried out in a network, the method comprising:
   generating, at a first station, an authentication request message destined to an authentication server;
   receiving the authentication request message at a second station;
   adding a new entry, that includes an authorization flag, in a routing table at the second station, the authorization flag indicating that an authentication response message is to be relayed by the second station before relaying other message or messages destined to or sourced by the first station;
   relaying the authentication request message destined to the authentication server; and
   generating the authentication response message at the authentication server upon receiving the authentication request message, the authentication response message for transmission to the first station.

2. The method as claimed in claim 1 wherein the network is a relay-based network.

3. The method as claimed in claim 2 wherein the network is an Opportunity Driven Multiple Access (ODMA) network.

4. The method as claimed in claim 1 wherein the second station maintains a record of connectivity with other stations.

5. The method as claimed in claim 1 further comprising:
   receiving the authentication request message at another station in-between the first station and the second station; and
   relaying the authentication request message from the another station to the second station.

6. The method as claimed in claim 3 wherein the authentication request message is encrypted using an RSA, DES, AES or Ksym encryption algorithm.

7. The method as claimed in claim 1 wherein the first station is not within a communications vicinity of the authentication server such that the first station does not have direct communicating capability in relation to the authentication server.

8. The method as claimed in claim 1 wherein the first station includes a smartcard to enable encryption and decryption.

9. The method as claimed in claim 8 wherein the smartcard further enables the first station to carry out a process that is in accordance with a Milenage algorithm.

10. The method as claimed in claim 1 wherein the first station is a wireless station.

11. The method as claimed in claim 1 wherein the authentication request message includes time-to-die information enabling a non-destination station that receives the authentication request message to selectively pass the authentication request message based on the time-to-die information.

12. The method as claimed in claim 1 wherein the authentication response message includes time-to-die information enabling a non-destination station that receives the authentication response message to selectively pass the authentication response message based on the time-to-die information.

13. The method as claimed in claim 1 wherein the authentication request message includes size information enabling a non-destination station that receives the authentication request message to selectively pass the authentication request message based on whether the size information is correct.

14. The method as claimed in claim 1 wherein the authentication response message includes size information enabling a non-destination station that receives the authentication response message to selectively pass the authentication response message based on whether the size information is correct.

15. The method as claimed in claim 1 further comprising:
   encrypting the authentication response message using a smartcard.

16. The method as claimed in claim 1 wherein the authentication server includes a distributed database wherein information is stored across different units.

17. A method carried out at a second station of a plurality of stations in a network, the method comprising:
   receiving an authentication request message at the second station of the plurality of stations, the authentication request message originating from a first station of the plurality of stations and destined to an authentication server;
   adding a new entry, that includes an authorization flag, in a routing table, the new entry related to a source of the authentication request message, and the authorization flag indicating that an authentication response message that will originate from the authentication server is to be relayed by the second station before relaying other message or messages destined to or sourced by the first station; and
   relaying the authentication request message destined to the authentication server.

18. The method as claimed in claim 17 wherein the network is a relay-based network.

19. The method as claimed in claim 18 wherein the network is an Opportunity Driven Multiple Access (ODMA) network.

20. The method as claimed in claim 17 wherein the second station maintains a record of connectivity with other stations.

21. The method as claimed in claim 17 wherein the authentication request message is encrypted using an RSA, DES, AES or Ksym encryption algorithm.

22. The method as claimed in claim 17 wherein the authentication request message includes time-to-die information enabling the second station to selectively block the authentication request message based on the time-to-die information.

23. The method as claimed in claim 17 wherein the authentication request message includes size information enabling the second station to selectively block the authentication request message based on whether the size information is correct.

* * * * *